(12) United States Patent
Yoshikawa et al.

(10) Patent No.: US 9,873,762 B2
(45) Date of Patent: Jan. 23, 2018

(54) POLYCARBOXYLIC ACID ANHYDRIDE AND USE THEREOF

(71) Applicant: NEW JAPAN CHEMICAL CO., LTD., Kyoto-shi, Kyoto (JP)

(72) Inventors: Hideyuki Yoshikawa, Kyoto (JP); Takayuki Nagashimada, Kyoto (JP); Maiko Yamazaki, Kyoto (JP); Eriko Harada, Kyoto (JP); Taiki Tsuji, Kyoto (JP); Masahiko Yamanaka, Kyoto (JP); Taro Yamazaki, Kyoto (JP)

(73) Assignee: NEW JAPAN CHEMICAL CO., LTD., Kyoto-shi (JP)

( * ) Notice: Subject to any disclaimer, the term of this patent is extended or adjusted under 35 U.S.C. 154(b) by 175 days.

(21) Appl. No.: 14/785,010

(22) PCT Filed: Apr. 18, 2014

(86) PCT No.: PCT/JP2014/061008
§ 371 (c)(1),
(2) Date: Oct. 16, 2015

(87) PCT Pub. No.: WO2014/171529
PCT Pub. Date: Oct. 23, 2014

(65) Prior Publication Data
US 2016/0075819 A1     Mar. 17, 2016

(30) Foreign Application Priority Data

Apr. 19, 2013 (JP) .................... 2013-088210

(51) Int. Cl.
| | |
|---|---|
| *C08G 63/16* | (2006.01) |
| *C08L 63/00* | (2006.01) |
| *C08L 67/02* | (2006.01) |
| *C08G 59/42* | (2006.01) |

(52) U.S. Cl.
CPC ......... *C08G 63/16* (2013.01); *C08G 59/4215* (2013.01); *C08L 63/00* (2013.01); *C08L 67/02* (2013.01)

(58) Field of Classification Search
None
See application file for complete search history.

(56) References Cited

U.S. PATENT DOCUMENTS

| | | | |
|---|---|---|---|
| 5,418,297 A | 5/1995 | Isozaki | |
| 5,428,082 A | 6/1995 | Gould et al. | |
| 5,578,695 A | 11/1996 | Isozaki | |
| 2009/0215969 A1* | 8/2009 | Kobayashi | C08G 59/4215 525/449 |
| 2009/0250825 A1* | 10/2009 | Tanaka | C08G 59/4215 257/787 |
| 2011/0031527 A1 | 2/2011 | Kotani et al. | |
| 2011/0039978 A1 | 2/2011 | Kotani et al. | |
| 2014/0128621 A1 | 5/2014 | Kotani et al. | |

FOREIGN PATENT DOCUMENTS

| | | |
|---|---|---|
| JP | 33-2147 B1 | 3/1958 |
| JP | 57-80339 A | 5/1982 |
| JP | 6-264007 A | 9/1994 |
| JP | 8-503502 A | 4/1996 |
| JP | 2008-81514 A | 4/2008 |
| JP | 2010-100798 A | 5/2010 |
| JP | 2010-106226 A | 5/2010 |
| WO | 1993/11188 A1 | 6/1993 |
| WO | 1994/11415 A1 | 5/1994 |

OTHER PUBLICATIONS

Extended (supplementary) European Search Report dated Nov. 4, 2016, issued in counterpart European Application No. 14785074.7. (5 pages).
"Sosetsu Epoxy Jushi Kisohen I" [Review of Epoxy Resin, Basic Edition I], The Japan Society of Epoxy Resin Technology ed., ed. 1, vol. 1, The Japan Society of Epoxy Resin Technology, Nov. 19, 2003, pp. 156-174, w/ English partial translation (11 pages).
International Search Report dated Jul. 22, 2014, issued in counterpart Application No. PCT/JP2014/061008 (2 pages).

* cited by examiner

*Primary Examiner* — Christopher M Rodd
(74) *Attorney, Agent, or Firm* — Westerman, Hattori, Daniels & Adrian, LLP

(57) ABSTRACT

The present invention relates to a polycarboxylic acid anhydride having a structural unit represented by the following Formula (1). The present invention provides a novel polycarboxylic acid anhydride. When the polycarboxylic acid anhydride is used, for example, as an epoxy resin-curing agent, the balance of the composition of the resin composition is stabilized, and a resin molded article having excellent heat resistance, transparency, thermal yellowing resistance, surface hardness, solvent resistance, flexibility, and adhesiveness is thus provided.

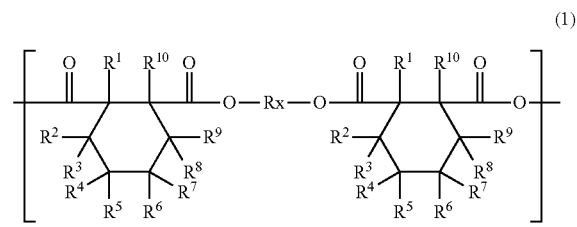

15 Claims, 8 Drawing Sheets

POLYCARBOXYLIC ACID ANHYDRIDE AND USE THEREOF

TECHNICAL FIELD

The present invention relates to a novel polycarboxylic acid anhydride and use thereof.

BACKGROUND ART

A carboxylic acid anhydride is a useful compound not only as a starting material for organic synthesis, but also as a starting material of or a modifier for alkyd resin, unsaturated polyester resin, polyamide resin, polyimide resin, photosensitive resin, and the like, as well as a curing agent for epoxy resin. A carboxylic acid anhydride is widely used as a starting material, a resin additive, or a resin-curing agent in various fields involving adhesive agents, coating compositions, inks, toners, coating agents, molding materials, electrical insulation materials, semiconductor sealing materials, resist materials, plasticizers, lubricants, fiber treatment agents, surfactants, pharmaceuticals, agricultural chemicals, and the like.

In particular, cyclic carboxylic acid anhydrides, such as tetrahydrophthalic anhydride, hexahydrophthalic anhydride, methyl tetrahydrophthalic anhydride, methyl hexahydrophthalic anhydride, methyl nadic anhydride, and hydrogenated methyl nadic anhydride, are characterized in that they have excellent miscibility as an epoxy resin-curing agent and in that they shrink to a small degree at the time that the resin is cured, achieving excellent dimensional stability of the resulting epoxy resin molded article (cured product).

Epoxy resin-curing agents containing such a cyclic carboxylic acid anhydride have a pot life longer than that of amine-based epoxy resin-curing agents, and cured resin products obtained using the cyclic carboxylic acid anhydride have more excellent transparency, as well as more excellent high-temperature electrical properties, compared with cured resin products obtained using an amine-based epoxy resin-curing agent. Thus, cured resin products obtained using the cyclic carboxylic acid anhydride are used as insulation materials in which electronic components are casted, impregnated, and laminated, and as sealing materials for optical semiconductors (Patent Literature (PTL) 1 and Non-patent Literature (NPL) 1).

However, when an epoxy resin is cured by heating using the cyclic carboxylic acid anhydride, the cyclic carboxylic acid anhydride itself undergoes volatilization under heating, causing problems such as contamination of the heating device and significant degradation of working environment. Further, a partial loss of the acid anhydride from the resin composition as described above problematically causes an imbalance of the composition of the resin composition, making it impossible to obtain desired curing properties. In particular, in the production of a coating film or a minute molded article, an acid anhydride, which undergoes volatilization while the resin is cured by heating, has a great effect on the physical properties of the resulting cured product, making it difficult to obtain the transparency, heat resistance, and the like, of the resin. For this reason, development of an acid anhydride that does not undergo volatilization (non-volatile acid anhydride) has been in demand. An acid anhydride undergoes volatilization while resin is cured by heating as above because an acid anhydride itself has a high vapor pressure.

In view of the above, chain (non-cyclic) polycarboxylic acid anhydrides formed by polycondensation of multivalent carboxylic acids have been developed as a replacement for cyclic carboxylic acid anhydrides. For example, chain polycarboxylic acid anhydrides obtained by an intermolecular dehydration-condensation reaction of aliphatic dicarboxylic acids, such as polyazelaic acid and polysebacic acid, have been used as a curing agent for thermosetting resins, such as epoxy resin, melamine resin, and acrylic powder coating compositions. When the chain polycarboxylic acid anhydride is used as a curing agent, the resulting cured product is likely to have excellent flexibility and excellent thermal shock resistance. Thus, the chain polycarboxylic acid anhydride is a useful compound as a curing agent for powdery coating compositions, as well as for casting resins (Patent Literature (PTL) 2).

Patent Literature (PTL) 3 discloses a compound having at least two non-cyclic acid anhydrides, the compound being represented by the following formula (I):

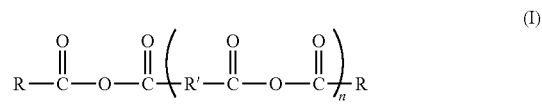

wherein R is a $C_{2-50}$ monovalent hydrocarbon group, and R' is a $C_{2-50}$ divalent hydrocarbon group, wherein the hydrocarbon groups represented by R and R' may contain an ether bond, a urethane bond, or an ester bond, and wherein n is an integer of 1 to 500. Patent Literature (PTL) 3 discloses that this compound is useful as a crosslinking agent (curing agent) for epoxy resin.

However, the compound specifically described in PTL 3 is a chain polyester compound (compound of Example 7) obtained from phthalic anhydride and 1,6-hexanediol, and has an aromatic ring, causing problems such that a cured product obtained using this compound is likely to be colored, and such that the glass transition temperature (Tg), which is an index of heat resistance, is significantly low.

Non-cyclic acid anhydrides have accordingly been developed; however, when these acid anhydrides are used as a resin-curing agent, the resulting resin molded article still suffers from various problems, and excellent resin molded articles are not currently obtained.

CITATION LIST

Patent Literature

PTL 1: JP2008-81514A
PTL 2: JP2010-106226A
PTL 3: WO 93/011188

Non-Patent Literature

NPL 1: The Japan Society of Epoxy Resin Technology ed., "*Sosetsu Epoxy Jushi Kisohen I*" [Review of Epoxy Resin, Basic Edition I], ed. 1, vol. 1, The Japan Society of Epoxy Resin Technology, Nov. 19, 2003, pp. 156-174

SUMMARY OF INVENTION

Technical Problem

An object of the present invention is to provide a novel polycarboxylic acid anhydride and a resin-curing agent containing this polycarboxylic acid anhydride.

Another object of the present invention is to provide a resin molded article having excellent heat resistance, transparency, thermal yellowing resistance, surface hardness, solvent resistance, flexibility, and adhesiveness.

Solution to Problem

The present inventors conducted extensive research to achieve the above objects, and found a novel polycarboxylic acid anhydride. The present inventors further found that a resin molded article produced by curing a composition obtained by incorporating the novel polycarboxylic acid anhydride into a resin can achieve the above objects. The present invention has thus been completed.

More specifically, the present invention provides the following polycarboxylic acid anhydride, production method thereof, use thereof, and the like.

Item 1. A polycarboxylic acid anhydride having a structural unit represented by Formula (1):

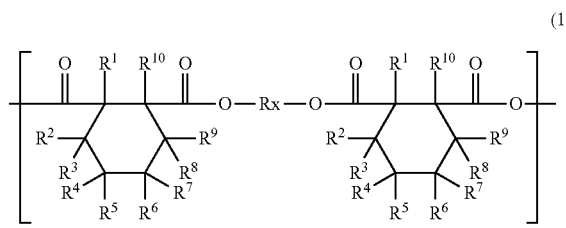

wherein Rx represents a cycloalkylene group or a group in which two or more cycloalkylene groups are bonded by a single bond or a divalent group, the cycloalkylene group being optionally substituted;

$R^1$ to $R^{10}$ are identical or different, and each represent hydrogen or optionally substituted alkyl; and two groups among $R^1$ to $R^{10}$ may together form a divalent group.

Item 2. The polycarboxylic acid anhydride according to Item 1, wherein Rx is a divalent group represented by Formula (2):

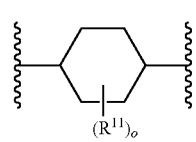

wherein $W_1$ and $W_2$ are identical or different, and each represent optionally substituted cycloalkylene;

$L_1$ is a single bond, optionally substituted alkylene, optionally substituted cycloalkylene, optionally substituted cycloalkylidene, —O—, —S—, —CO—, —SO—, or —SO$_2$—;

n is an integer of 0 or 1; and the wavy lines represent attachment sites.

Item 3. The polycarboxylic acid anhydride according to Item 2, wherein $W_1$ and $W_2$ are identical or different, and are selected from divalent groups represented by Formula (a) or (b):

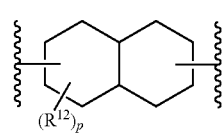

wherein $R^{11}$ and $R^{12}$ are identical or different, and each represent optionally substituted alkyl or optionally substituted cycloalkyl;

o is an integer of 0 to 8, when o represents 2 to 8, two to eight $R^{11}$ groups may be identical or different, and when o represents 2 to 8, two $R^{11}$ groups may together form a divalent group;

p is an integer of 0 to 12, when p represents 2 to 12, two to twelve $R^{12}$ groups may be identical or different, and when p represents 2 to 12, two $R^{12}$ groups may together form a divalent group; and the wavy lines represent attachment sites.

Item 4. The polycarboxylic acid anhydride according to Item 1, wherein the polycarboxylic acid anhydride having the structural unit represented by Formula (1) is a compound represented by Formula (3):

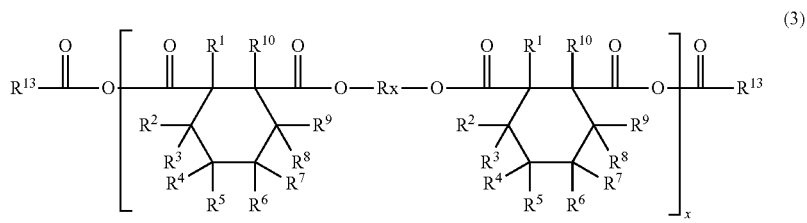

wherein Rx and $R^1$ to $R^{10}$ are as defined above; $R^{13}$ represents optionally substituted alkyl or optionally substituted cycloalkyl; and x represents 2 or more.

Item 5. The polycarboxylic acid anhydride according to Item 1, which has a number average molecular weight (polystyrene basis) of 500 to 6000.

Item 6. The polycarboxylic acid anhydride according to Item 1, which has a characteristic infrared absorption spectrum at 1800 to 1825 cm$^{-1}$.

Item 7. A method for producing the polycarboxylic acid anhydride of Item 1, the method comprising the step of performing a condensation reaction in a reaction liquid containing a compound represented by Formula (4):

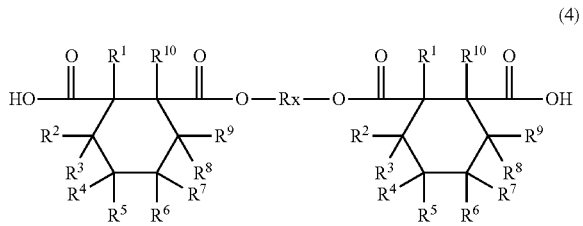

(4)

wherein Rx and $R^1$ to $R^{10}$ are as defined above.

Item 8. The polycarboxylic acid anhydride obtained by the production method of Item 7.

Item 9. A polycarboxylic acid anhydride having a structural unit represented by Formula (1):

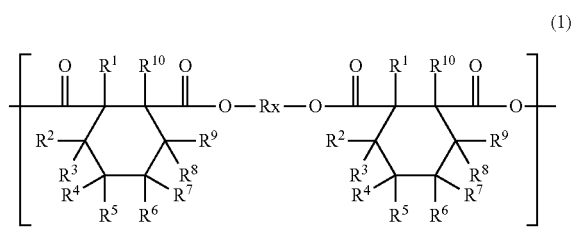

(1)

wherein Rx represents a cycloalkylene group or a group in which two or more cycloalkylene groups are bonded by a single bond or a divalent group, the cycloalkylene group being optionally substituted;
$R^1$ to $R^{10}$ are identical or different and each represent hydrogen or optionally substituted alkyl; and
two groups among $R^1$ to $R^{10}$ may together form a divalent group; and a structural unit represented by Formula (5):

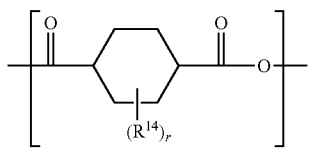

(5)

wherein each $R^{14}$ is identical or different, and represents optionally substituted alkyl or optionally substituted cycloalkyl;
r is an integer of 0 to 8, when r represents 2 to 8, two to eight $R^{14}$ groups may be identical or different, and when r represents 2 to 8, two $R^{14}$ groups may together form a divalent group.

Item 10. The polycarboxylic acid anhydride according to Item 9, wherein Rx is a divalent group represented by Formula (2):

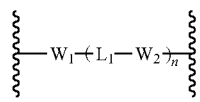

(2)

wherein $W_1$ and $W_2$ are identical or different, and each represent optionally substituted cycloalkylene;
$L_1$ is a single bond, optionally substituted alkylene, optionally substituted cycloalkylene, optionally substituted cycloalkylidene, —O—, —S—, —CO—, —SO—, or —$SO_2$—;
n is an integer of 0 or 1; and
the wavy lines represent attachment sites.

Item 11. The polycarboxylic acid anhydride according to Item 9, wherein the molar ratio of the structural unit represented by Formula (1) to the structural unit represented by Formula (5) is within a range of 99.9:0.1 to 30:70.

Item 12. The polycarboxylic acid anhydride according to Item 11, wherein the molar ratio of the structural unit represented by Formula (1) to the structural unit represented by Formula (5) is within a range of 90:10 to 45:55.

Item 13. The polycarboxylic acid anhydride according to Item 9, wherein $W_1$ and $W_2$ are identical or different, and are selected from divalent groups represented by Formula (a) or (b):

(a)

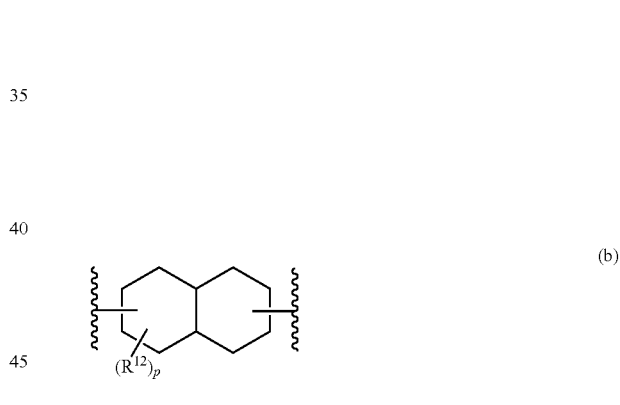

(b)

wherein $R^{11}$ and $R^{12}$ are identical or different, and each represent optionally substituted alkyl or optionally substituted cycloalkyl;
o is an integer of 0 to 8, when o represents 2 to 8, two to eight $R^{11}$ groups may be identical or different, and when o represents 2 to 8, two $R^{11}$ groups may together form a divalent group;
p is an integer of 0 to 12, when p represents 2 to 12, two to twelve $R^{12}$ groups may be identical or different, and when p represents 2 to 12, two $R^{12}$ groups may together form a divalent group; and
the wavy lines represent attachment sites.

Item 14. The polycarboxylic acid anhydride according to Item 9, wherein the polycarboxylic acid anhydride having the structural unit represented by Formula (1) and the structural unit represented by Formula (5) is a compound represented by Formula (6):

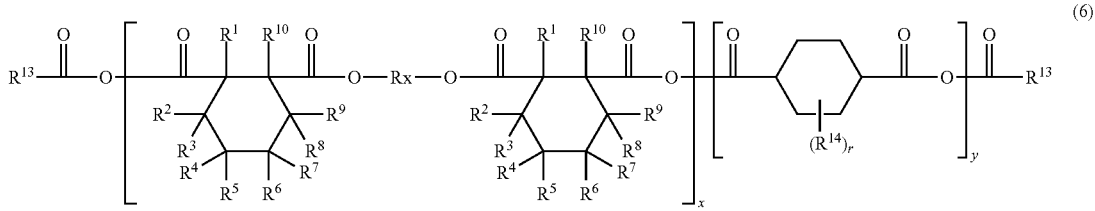

wherein Rx, $R^1$ to $R^{10}$, $R^{14}$, and r are as defined above,
$R^{13}$ represents optionally substituted alkyl or optionally substituted cycloalkyl,
x represents 1 or more, y represents 1 or more, x+y is 2 or more, and
the sequence of units x and y is not limited to the above order.

Item 15. The polycarboxylic acid anhydride according to Item 9, which has a number average molecular weight (polystyrene basis) of 500 to 6000.

Item 16. The polycarboxylic acid anhydride according to Item 9, which has a characteristic infrared absorption spectrum at 1800 to 1825 $cm^{-1}$.

Item 17. A method for producing the polycarboxylic acid anhydride of Item 9, the method comprising the step of performing a condensation reaction in a reaction liquid containing a compound represented by Formula (4):

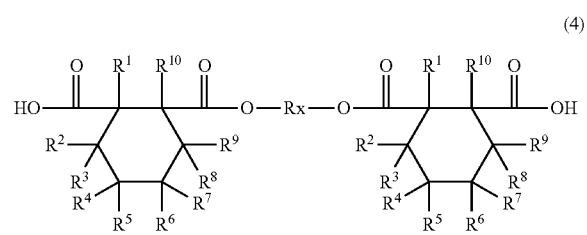

wherein Rx, and $R^1$ to $R^{10}$ are as defined above,
and a cyclohexanedicarboxylic acid compound represented by Formula (7):

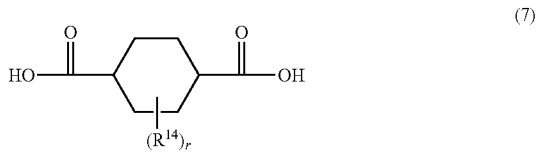

wherein $R^{14}$ and r are as defined above.

Item 18. A method for producing the polycarboxylic acid anhydride of Item 17, wherein the feed molar ratio of the compound represented by Formula (4) to the cyclohexanedicarboxylic acid compound represented by Formula (7) is within a range of 99.9:0.1 to 30:70.

Item 19. The polycarboxylic acid anhydride-producing method according to Item 18, wherein the feed molar ratio of the compound represented by Formula (4) to the cyclohexanedicarboxylic acid compound represented by Formula (7) is within a range of 90:10 to 45:55.

Item 20. A polycarboxylic acid anhydride obtained by the production method of Item 19.

Item 21. An epoxy resin-curing agent containing the polycarboxylic acid anhydride of any one of Items 1 to 6, 8 to 16, and 18 to 20.

Item 22. A composition containing the epoxy resin-curing agent (a) of Item 21, an epoxy resin (b), and a cure accelerator (c).

Item 23. A molded article obtained by curing the composition of Item 22.

Item 24. A method for forming a thin film, the method comprising applying the composition of Item 22 on a substrate, and curing the composition to form a thin film having a thickness of 1 mm or less.

Item 25. A thin film having a thickness of 1 mm or less, the film being obtained by curing the composition of Item 22.

Item 26. The thin film according to Item 25, which is a coating material for display.

Advantageous Effects of Invention

The present invention provides a novel polycarboxylic acid anhydride and a resin-curing agent containing the polycarboxylic acid anhydride. When the polycarboxylic acid anhydride is incorporated into a resin, and when the resulting composition is cured, it is possible to obtain a resin molded article having excellent heat resistance, transparency, thermal yellowing resistance, surface hardness, solvent resistance, flexibility, and adhesiveness.

DESCRIPTION OF EMBODIMENTS

Figure 1:
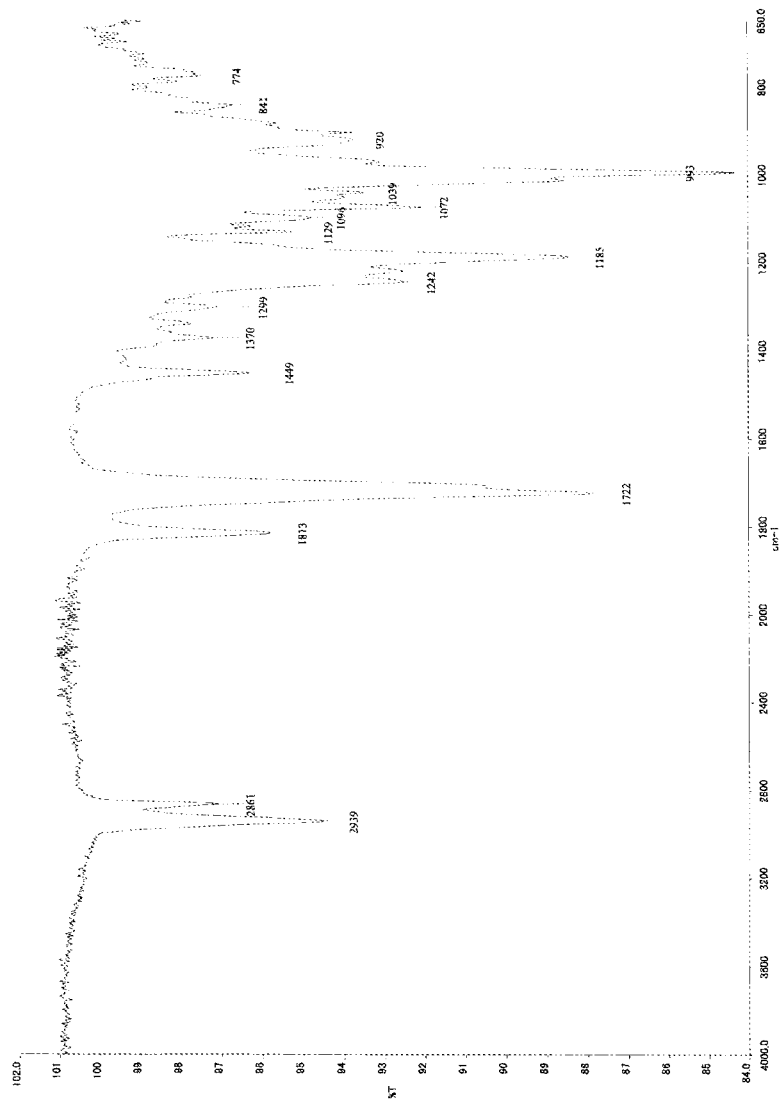
FIG. 1 is an infrared absorption spectrum of a polycarboxylic acid anhydride obtained by drying the polycarboxylic acid anhydride solution obtained in Example 1, and distilling off the solvent.

The following specifically describes the novel polycarboxylic acid anhydride of the present invention, the production method thereof, and the use thereof.

In this specification, the term "contain" conceptually means "contain," "essentially consisting of," and "consisting of."

1. Polycarboxylic Acid Anhydride

The polycarboxylic acid anhydride of the present invention is a compound described in (1-1) or (1-2) below. Hereinafter, the compound described in (1-1) is sometimes referred to as a "polycarboxylic acid anhydride of two-component system," and the compound described in (1-2) is sometimes referred to as a "polycarboxylic acid anhydride of three-component system."

(1-1) Polycarboxylic Acid Anhydride of Two-Component System

The polycarboxylic acid anhydride of two-component system of the present invention is a compound obtained by a condensation reaction in a reaction liquid containing a polycarboxylic acid anhydride having a structural unit represented by Formula (4):

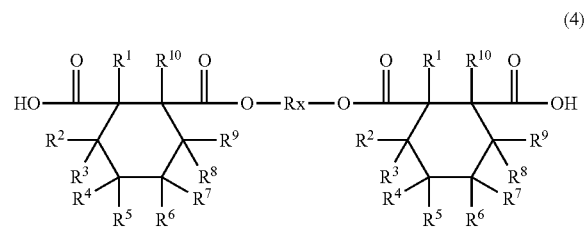

(4)

wherein Rx represents a cycloalkylene group or a group in which two or more cycloalkylene groups are bonded by a single bond or a divalent group, the cycloalkylene group being optionally substituted;

$R^1$ to $R^{10}$ are identical or different, and each represent hydrogen or optionally substituted alkyl; and two groups among $R^1$ to $R^{10}$ may together form a divalent group.

Examples of the thus-obtained polycarboxylic acid anhydride of two-component system of the present invention include a polycarboxylic acid anhydride having a structural unit represented by Formula (1):

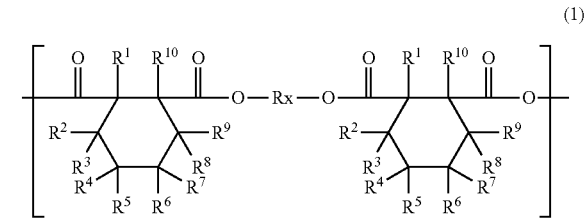

(1)

wherein Rx, and $R^1$ to $R^{10}$ are as defined above.

Rx in Formula (4) or Formula (1) may be a cycloalkylene group or a group in which two or more cycloalkylene groups are bonded by a single bond or a divalent group. Examples of Rx include a divalent group represented by the following Formula (2):

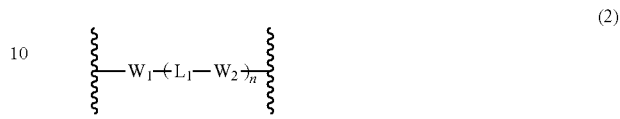

(2)

wherein $W_1$ and $W_2$ are identical or different and each represent optionally substituted cycloalkylene;

$L_1$ is a single bond, optionally substituted alkylene, optionally substituted cycloalkylene, optionally substituted cycloalkylidene, —O—, —S—, —CO—, —SO—, or —SO$_2$—;

n is an integer of 0 or 1; and the wavy lines represent attachment sites.

Specifically, when Rx is a divalent group represented by Formula (2) above, the polycarboxylic acid anhydride of two-component system of the present invention is a compound obtained by a condensation reaction in a reaction liquid containing a compound represented by Formula (8):

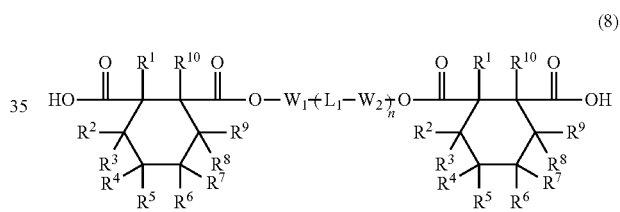

(8)

wherein $W_1$, $W_2$, $L_1$, n, and $R^1$ to $R^{10}$ are as defined above.

Examples of the thus-obtained polycarboxylic acid anhydride of two-component system include a compound having a structural unit represented by Formula (9):

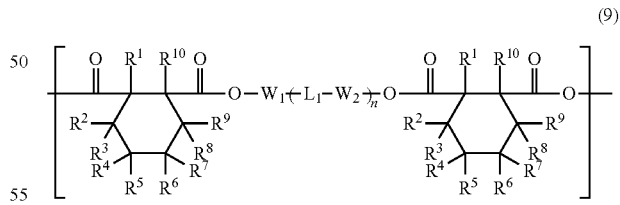

(9)

wherein $W_1$, $W_2$, $L_1$, n, and $R^1$ to $R^{10}$ are as defined above.

The polycarboxylic acid anhydride of the present invention having a structural unit represented by Formula (1) or Formula (9) is, for example, a compound having a carboxyl (—COOH) group at both ends, and is preferably a compound in which the hydrogen atom of the carboxyl group at both ends of the polycarboxylic acid anhydride of the present invention is replaced with a group represented by Formula (10):

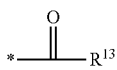
(10)

wherein $R^{13}$ represents optionally substituted alkyl or optionally substituted cycloalkyl; and
* represents the site of attachment.

Specific examples thereof include a compound represented by Formula (3):

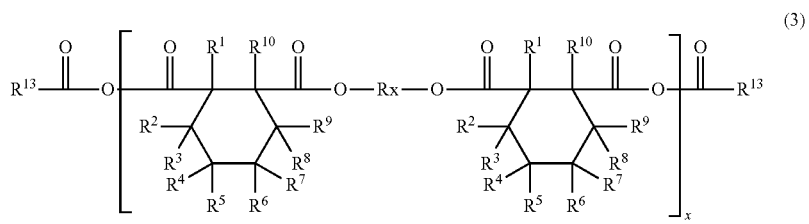
(3)

wherein Rx, $R^1$ to $R^{10}$, and $R^{13}$ are as defined above; and x represents 2 or more;
and a compound represented by Formula (11):

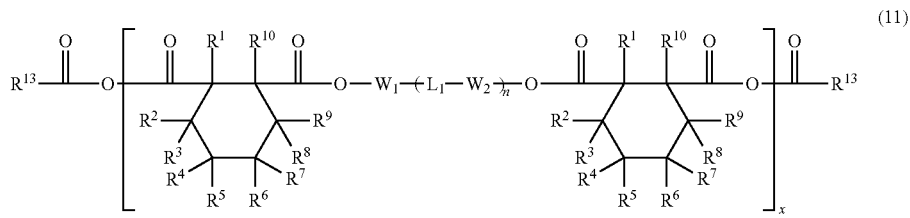
(11)

wherein $W_1$, $W_2$, $L_1$, n, $R^1$ to $R^{10}$, $R^{13}$, and x is as defined above.

Each group shown in Formulae (1) to (4) and (8) to (11) are specifically described below.

The cycloalkylene represented by Rx, $W_1$, and $W_2$ is not limited, and may be, for example, $C_{3-50}$ cycloalkylene. Specific examples include monocyclic cycloalkylene groups, such as cyclopropylene, cyclobutylene, cyclopentylene, and cyclohexylene; and polycyclic cycloalkylene groups, such as 7-oxabicyclo[2,2,1]heptylene, decahydronaphthalene (hydrogenated naphthalene), norbornylene, and adamantylene. The cycloalkylene may optionally further have 1 to 8 substituents, such as alkyl, cycloalkyl, and halogen.

The cycloalkylene represented by Rx, $W_1$, and $W_2$ is preferably a divalent group represented by the following Formula (a) or (b):

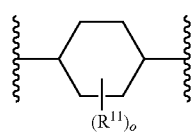
(a)

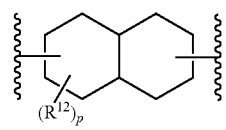
(b)

wherein $R^{11}$ and $R^{12}$ are identical or different, and each represent optionally substituted alkyl or optionally substituted cycloalkyl;

o is an integer of 0 to 8, when o represents 2 to 8, two to eight $R^{11}$ groups may be identical or different, and when o represents 2 to 8, two $R^{11}$ groups may together form a divalent group;

p is an integer of 0 to 12, when p represents 2 to 12, two to twelve $R^{12}$ groups may be identical or different, and when p represents 2 to 12, two $R^{12}$ groups may together form a divalent group; and the wavy lines represent attachment sites.

The cycloalkylene groups represented by Formula (a) above are more preferably divalent groups represented by the following (a-1) to (a-8):

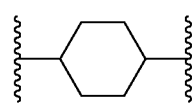
(a-1)

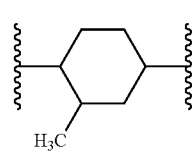
(a-2)

-continued

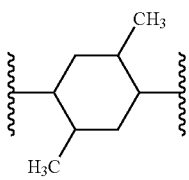
(a-3)

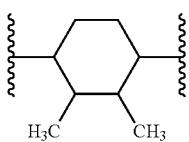
(a-4)

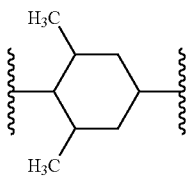
(a-5)

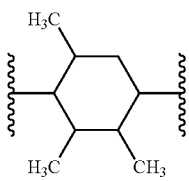
(a-6)

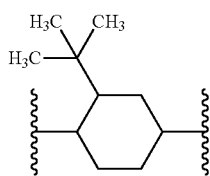
(a-7)

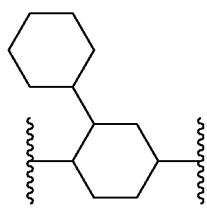
(a-8)

wherein the wavy lines are as defined above.

Examples of the decahydronaphthalene group represented by Formula (b) above include divalent groups, such as 2,7-decahydronaphthalene represented by Formula (b-1), 2,6-decahydronaphthalene represented by Formula (b-2), 1,6-decahydronaphthalene represented by Formula (b-3), 1,7-decahydronaphthalene represented by Formula (b-4), 1,8-decahydronaphthalene represented by Formula (b-5), and 1,5-decahydronaphthalene represented by Formula (b-6), with 2,7-decahydronaphthalene represented by Formula (b-1) or 2,6-decahydronaphthalene represented by Formula (b-2) being preferable.

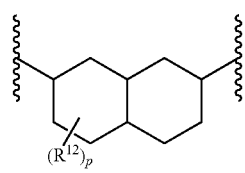
(b-1)

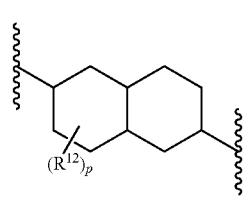
(b-2)

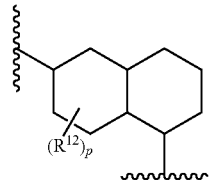
(b-3)

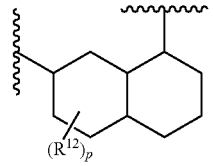
(b-4)

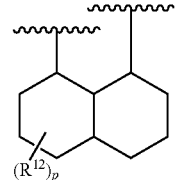
(b-5)

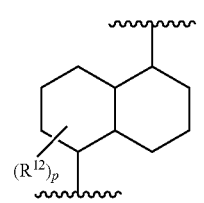
(b-6)

wherein $R^{12}$, p, and the wavy lines are as defined above. The divalent group represented by Formula (b) above is more preferably a divalent group represented by (b-1-1) or (b-2-1) below:

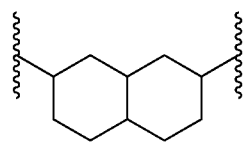
(b-1-1)

(b-2-1)

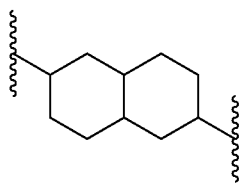

wherein the wavy lines are as defined above.

In this specification, when a wavy line is shown in a divalent group, its direction is not particularly limited. The direction may be as shown herein, or may be a reversed direction.

The cycloalkylene represented by Rx, $W_1$, and $W_2$, or the group represented by RX in which two or more cycloalkylene groups are bonded by a single bond or a divalent group, may be rephrased as a group in which two hydroxyl groups are removed from a cycloalkane diol.

Examples of the group in which two hydroxyl groups are removed from a cycloalkane diol include groups in which two hydroxyl groups are removed from monocyclic cycloalkane diols, such as 1,2-cyclopropanediol, 1,2-cyclobutanediol, 1,3-cyclobutanediol, 1,2-cyclopentanediol, 1,3-cyclopentanediol, 1,2-cyclohexanediol, 1,3-cyclohexanediol, 1,4-cyclohexanediol, 1,2-cycloheptanediol, 1,3-cycloheptanediol, and 1,4-cycloheptanediol; and groups in which two hydroxyl groups are removed from a polycyclic cycloalkane diol, such as hydrogenated bisphenols, such as norbornene, dicyclopentadienediols, adamantanediols, hydrogenated naphthalenediols, hydrogenated biphenyldiols, hydrogenated bisphenol A, hydrogenated bisphenol C, hydrogenated bisphenol E, hydrogenated bisphenol F, and hydrogenated bisphenol Z. Of these, a group in which two hydroxyl groups are removed from 1,4-cyclohexanediol, a hydrogenated naphthalenediol, or a hydrogenated bisphenol is preferable.

$L_1$ in Formulae (2), (8), (9), and (11) may be a single bond, optionally substituted alkylene, optionally substituted cycloalkylene, optionally substituted cycloalkylidene, or a divalent group represented by —O—, —S—, —CO—, —SO—, or —$SO_2$—.

Examples of the alkylene group of the optionally substituted alkylene represented by $L_1$ include, but are not particularly limited to, linear $C_{1-10}$ alkylene groups. Of these, linear $C_{1-6}$ alkylene groups, such as methylene, ethylene, propylene, butylene, pentylene, and hexylene, are preferable, and methylene is more preferable.

Specific examples of $L_1$, when it represents optionally substituted methylene, include a group represented by Formula (c):

(c)

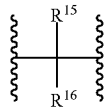

wherein $R^{15}$ and $R^{16}$ are identical or different and each represent hydrogen, optionally halogen-substituted alkyl, or optionally halogen-substituted cycloalkyl, and the wavy lines represent attachment sites.

Of the groups represented by Formula (c) above, the divalent groups represented by (c-1) to (c-8) below are preferable:

(c-1)

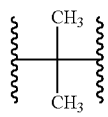

(c-2)

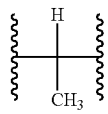

(c-3)

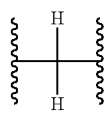

(c-4)

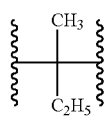

(c-5)

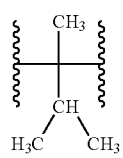

(c-6)

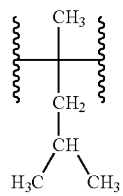

(c-7)

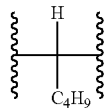

(c-8)

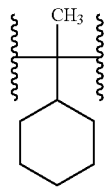

wherein the wavy lines represent attachment sites.

In Formulae (2), (8), (9), and (11), examples of the cycloalkylene group of the optionally substituted cycloalkylene represented by $L_1$ include, but are not particularly limited to, $C_{3-10}$ cycloalkylene groups. Of these, $C_{3-6}$ cycloalkylene groups, such as 1,2-cyclopropanediyl, 1,2-cyclobutanediyl, 1,2-cyclopentanediyl, 1,3-cyclopentanediyl, 1,2-cyclohexanediyl, 1,3-cyclohexanediyl, and 1,4-cyclohexanediyl are preferable, and 1,4-cyclohexanediyl is particularly preferable.

Examples of the cycloalkylidene group of the optionally substituted cycloalkylidene represented by $L_1$ in Formulae (2), (8), (9), and (11) include, but are not particularly limited to, $C_{3-30}$ cycloalkylidene. The optionally substituted cycloalkylidene is preferably $C_{3-20}$ cycloalkylidene, such as cyclopropylidene, cyclobutylidene, cycloheptylidene, cyclohexylidene, and 3,5,5-trimethyl cyclohexylidene, and is particularly preferably cyclohexylidene or 3,5,5-trimethyl cyclohexylidene.

Examples of the alkyl group of the optionally substituted alkyl represented by $R^1$ to $R^{10}$ include, but are not particularly limited to, linear or branched $C_{1-10}$ alkyl. Specific examples include $C_{1-6}$ alkyl groups, such as methyl, ethyl, n-propyl, isopropyl, n-butyl, isobutyl, tert-butyl, pentyl, and hexyl. Of these, methyl, ethyl, isobutyl, and tert-butyl are preferable. The alkyl may optionally further have one or more substituents, such as cycloalkyl and halogen.

Examples of the alkyl group of the optionally substituted alkyl represented by $R^{11}$ and $R^{12}$ include, but are not particularly limited to, linear or branched $C_{1-10}$ alkyl groups. Specific examples include $C_{1-6}$ alkyl groups, such as methyl, ethyl, n-propyl, isopropyl, n-butyl, isobutyl, tert-butyl, pentyl, and hexyl. Of these, methyl, ethyl, isobutyl, and tert-butyl are preferable. The alkyl may optionally further have one or more substituents, such as cycloalkyl and halogen.

Examples of the cycloalkyl group of the optionally substituted cycloalkyl represented by $R^{11}$ and $R^{12}$ include, but are not particularly limited to, $C_{3-30}$ cycloalkyl groups. Specific examples include monocyclic cycloalkyl groups, such as cyclopropyl, cyclobutyl, cyclopentyl, and cyclohexyl; and polycyclic cycloalkyl groups, such as tetrahydronaphthyl (hydrogenated naphthyl), norbornyl, and adamantyl. Of these, cyclohexyl is particularly preferable. The cycloalkyl may optionally further have one or more substituents, such as alkyl, cycloalkyl, and halogen.

Examples of the alkyl group of the optionally substituted alkyl represented by $R^{13}$ include, but are not particularly limited to, linear or branched $C_{1-10}$ alkyl groups. Specific examples include $C_{1-6}$ alkyl groups, such as methyl, ethyl, n-propyl, isopropyl, n-butyl, isobutyl, tert-butyl, pentyl, and hexyl. Of these, methyl, ethyl, isobutyl, and tert-butyl are preferable. The alkyl may optionally further have one or more substituents, such as cycloalkyl and halogen.

Examples of the cycloalkyl group of the optionally substituted cycloalkyl represented by $R^{13}$ include, but are not particularly limited to, $C_{3-30}$ cycloalkyl. Specific examples include monocyclic cycloalkyl groups, such as cyclopropyl, cyclobutyl, cyclopentyl, and cyclohexyl; and polycyclic cycloalkyl groups, such as tetrahydronaphthyl (hydrogenated naphthyl), norbornyl, and adamantyl. Of these, cyclohexyl is particularly preferable. The cycloalkyl may optionally further have one or more substituents, such as alkyl, cycloalkyl, and halogen.

Examples of the optionally halogen-substituted alkyl represented by $R^{15}$ and $R^{16}$ include, but are not particularly limited to, linear or branched $C_{1-10}$ alkyl groups optionally substituted with one or more halogen atoms. Specific examples include unsubstituted $C_{1-6}$ alkyl groups, such as methyl, ethyl, n-propyl, isopropyl, n-butyl, isobutyl, tert-butyl, pentyl, and hexyl; and $C_{1-6}$ haloalkyl groups, such as trifluoromethyl, pentafluoroethyl, and trichloromethyl. Of these, methyl, ethyl, isobutyl, and trifluoromethyl are preferable.

Examples of the optionally halogen-substituted cycloalkyl represented by $R^{15}$ and $R^{16}$ include, but are not particularly limited to, $C_{3-30}$ cycloalkyl groups. Specific examples include monocyclic cycloalkyl groups, such as cyclopropyl, cyclobutyl, cyclopentyl, and cyclohexyl; and polycyclic cycloalkyl groups, such as tetrahydronaphthyl (hydrogenated naphthyl), norbornyl, and adamantyl. Of these, cyclohexyl is particularly preferable. The cycloalkyl may optionally further have one or more substituents, such as alkyl, cycloalkyl, and halogen.

Examples of the alkyl groups shown in this specification as a substituent include linear or branched $C_{1-10}$ alkyl groups. Preferable examples include $C_{1-6}$ alkyl groups, such as methyl, ethyl, n-propyl, isopropyl, n-butyl, isobutyl, tert-butyl, pentyl, and hexyl, with methyl being particularly preferable.

Examples of the cycloalkyl groups shown in this specification as a substituent include, but are not particularly limited to, $C_{3-10}$ cycloalkyl groups. Preferable examples include monocyclic cycloalkyl groups, such as cyclopropyl, cyclobutyl, cyclopentyl, and cyclohexyl; and polycyclic cycloalkyl groups, such as tetrahydronaphthyl (hydrogenated naphthyl), norbornyl, and adamantyl. Of these, cyclohexyl is particularly preferable.

Examples of the halogen atoms shown in this specification as a substituent include fluorine, chlorine, bromine, iodine, and the like, with fluorine or chlorine being preferable.

When two groups among $R^1$ to $R^{10}$ together form a divalent group, the divalent group may be, for example, alkylene.

When two groups among $R^1$ to $R^{10}$ together form alkylene, specific examples of the group represented by the following Formula (d):

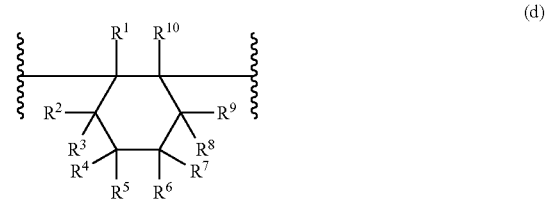

wherein $R^1$ to $R^{10}$ and the wavy lines are as defined above, include groups represented by the following (d-1):

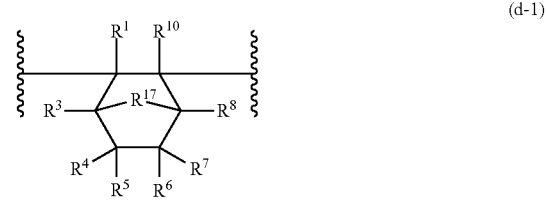

wherein $R^1$, $R^3$ to $R^8$, $R^{10}$, and the wavy lines are as defined above, and $R^{17}$ represents optionally substituted alkylene. Examples of the alkylene as used herein include, but are not particularly limited to, linear $C_{1-4}$ alkylene groups. Preferable examples include $C_{1-4}$ alkylene groups, such as methylene, ethylene, propylene, and butylene. Of these, methylene or ethylene is more preferable.

Of the groups represented by Formula (d-1) above, groups represented by the following Formula (d-1-1), groups represented by the following Formula (d-1-2), and groups represented by the following Formula (d-1-3) are particularly preferable.

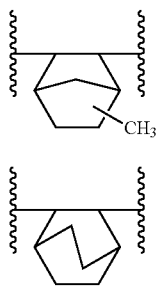

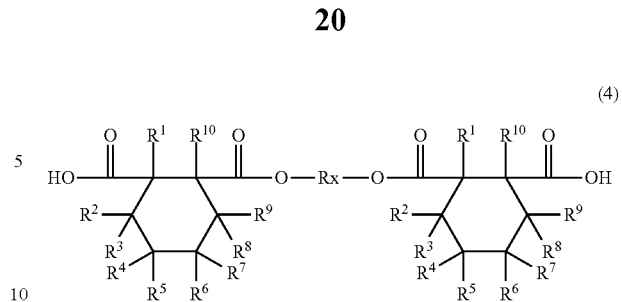

wherein the wavy lines are as defined above.

In Formula (a) above, when o represents 2 to 8, two $R^{11}$ groups may together form a divalent group. Examples of the divalent group include optionally substituted alkylene groups. The optionally substituted alkylene groups are those listed above for $L_1$.

In Formula (b) above, when p represents 2 to 12, two $R^{12}$ groups may together form a divalent group. Examples of the divalent group include optionally substituted alkylene groups. The optionally substituted alkylene groups are those listed above for $L_1$.

The thus-obtained polycarboxylic acid anhydride of two-component system can exist as cis and trans isomers, depending on the configuration of two alcohol groups or two carboxyl groups. To exert the effects of the present invention, any of trans isomers, cis isomers, and mixtures thereof may be used.

In Formulae (3) and (11), x is an integer of 2 or more, preferably 2 to 100, and more preferably 4 to 20. x represents the average number of polymer units, and is obtained by a gel permeation chromatography (GPC) method.

The polycarboxylic acid anhydride of two-component system of the present invention has a number average molecular weight within a range of preferably 500 to 6000, and more preferably 2000 to 6000. The number average molecular weight is measured using well-known methods, such as gel permeation chromatography (GPC), and is calculated as a number average molecular weight (Mn) on a polystyrene basis.

The polycarboxylic acid anhydride of two-component system of the present invention has an acid anhydride equivalent within a range of preferably 300 to 5000 g/eq, more preferably 500 to 3000 g/eq, and particularly preferably 600 to 1500 g/eq. The acid anhydride equivalent is calculated using the equation shown in the Examples described later.

The polycarboxylic acid anhydride of two-component system of the present invention hardly undergoes volatilization at a temperature within a range in which epoxy resin is generally cured.

The polycarboxylic acid anhydride of two-component system of the present invention shows a characteristic peak from acid anhydride in the range of 1790 to 1835 cm$^{-1}$, in particular in the range of 1800 to 1825 cm$^{-1}$.

(1-2) Polycarboxylic Acid Anhydride of Three-Component System

The polycarboxylic acid anhydride of three-component system of the present invention is a compound obtained by a condensation reaction in a reaction liquid containing a compound represented by Formula (4):

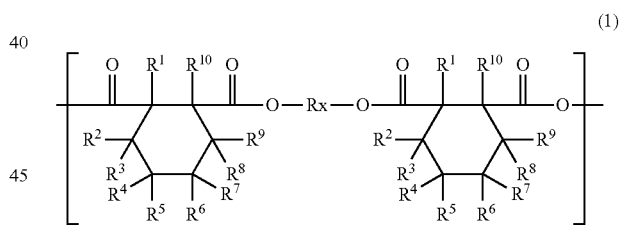

wherein Rx, and $R^1$ to $R^{10}$ are as defined above, and a compound represented by Formula (7):

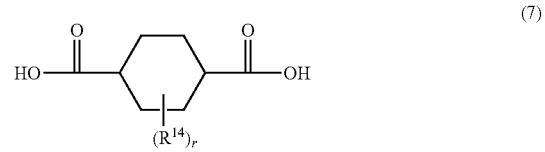

wherein each $R^{14}$ is identical or different and represents optionally substituted alkyl or optionally substituted cycloalkyl; and r is an integer of 0 to 8, when r represents 2 to 8, two to eight $R^{14}$ groups may be identical or different, and when r represents 2 to 8, two $R^{14}$ groups may together form a divalent group.

Examples of the thus-obtained polycarboxylic acid anhydride of three-component system include a compound having a structural unit represented by Formula (1):

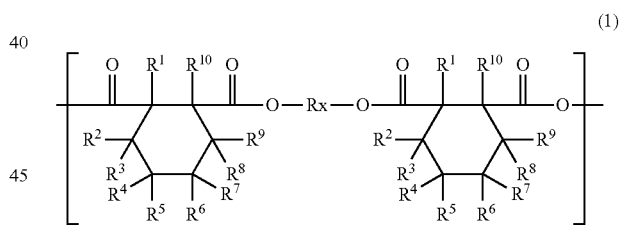

wherein Rx, and $R^1$ to $R^{10}$ are as defined above, and a structural unit represented by Formula (5):

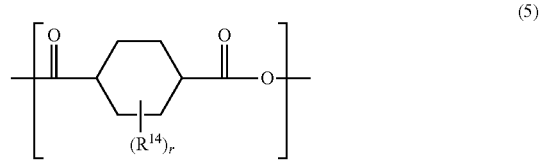

wherein $R^{14}$ and r are as defined above.

In Formula (4) or Formula (1), Rx may be a cycloalkylene group or a group in which two or more cycloalkylene groups are bonded by a single bond or a divalent group. Examples of Rx include divalent groups represented by the following Formula (2):

(2)

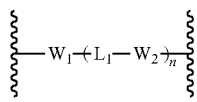

wherein $W_1$, $W_2$, $L_1$, n, and the wavy lines are as defined above. Specifically, when Rx is a divalent group represented by Formula (2) above, the polycarboxylic acid anhydride of three-component system of the present invention is a compound obtained by a condensation reaction in a reaction liquid containing a compound represented by Formula (8):

(8)

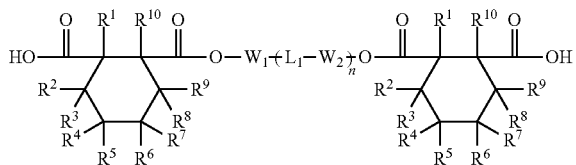

wherein $W_1$, $W_2$, $L_1$, n, and $R^1$ to $R^{10}$ are as defined above, and a cyclohexanedicarboxylic acid compound represented by Formula (7) above. Examples of the thus-obtained polycarboxylic acid anhydride of three-component system include a compound having a structural unit represented by Formula (9):

(9)

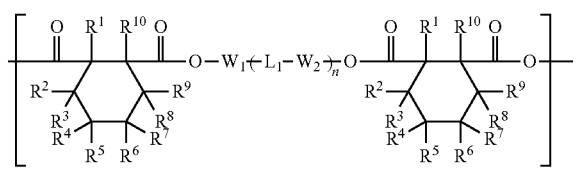

wherein $W_1$, $W_2$, $L_1$, n, and $R^1$ to $R^{10}$ are as defined above, and a structural unit represented by Formula (5):

(5)

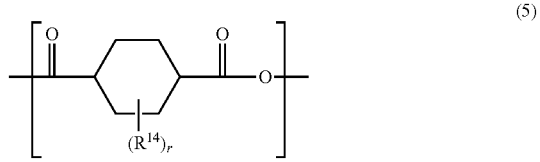

wherein $R^{14}$ and r are as defined above.

The polycarboxylic acid anhydride of three-component system of the present invention is, for example, a compound having a carboxyl (—COOH) group at both ends, and is preferably a compound in which the hydrogen atom of the carboxyl group at both ends of the polycarboxylic acid anhydride of the present invention is replaced with a group represented by Formula (10):

(10)

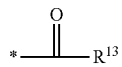

wherein $R^{13}$ is optionally substituted alkyl or optionally substituted cycloalkyl, and

* indicates the site of attachment.

Specific examples thereof include compounds represented by Formula (6):

(6)

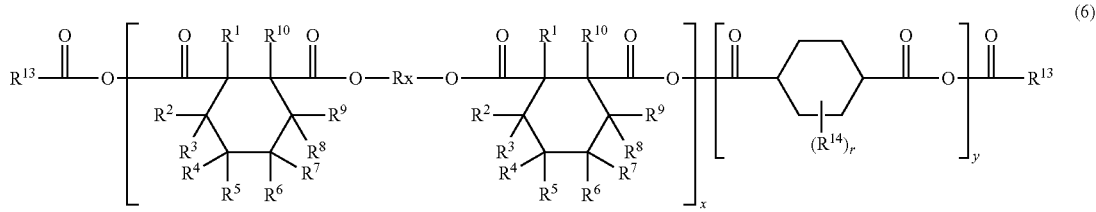

wherein Rx, $R^1$ to $R^{10}$, $R^{14}$, and r are as defined above,
$R^{13}$ represents optionally substituted alkyl or optionally substituted cycloalkyl,
x represents 1 or more, y represents 1 or more, and x+y is 2 or more, and
the sequence of units x and y is not limited to the above order, and compounds represented by Formula (12):

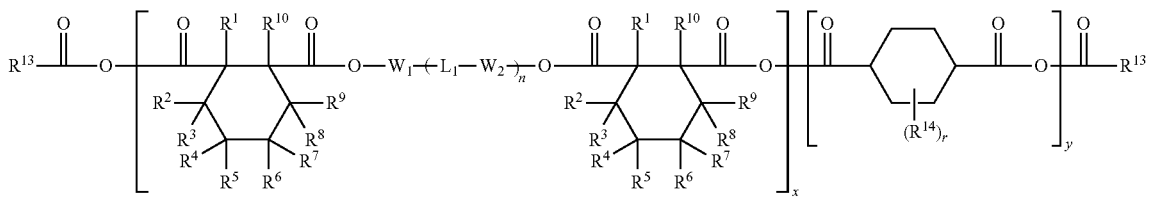

(12)

wherein $W_1$, $W_2$, $L_1$, $R^1$ to $R^{10}$, $R^{13}$, $R^{14}$, r, n, x, and y are as defined above.

Of the groups represented by Formulae (1), (2), (4) to (10), and (12) above, Rx, $R^1$ to $R^{13}$, $W_1$, $W_2$, $L_1$, and n are equal to the groups listed in (1-1) above for the polycarboxylic acid anhydride of two-component system.

The following describes groups that are not mentioned in (1-1) above.

Examples of the alkyl group of the optionally substituted alkyl represented by $R^{14}$ include, but are not particularly limited to, linear or branched $C_{1-10}$ alkyl groups. Specific examples include $C_{1-6}$ alkyl groups, such as methyl, ethyl, n-propyl, isopropyl, n-butyl, isobutyl, tert-butyl, pentyl, and hexyl. Of these, methyl, ethyl, isobutyl, and tert-butyl are preferable. The alkyl may optionally further have one or more substituents, such as cycloalkyl and halogen.

Examples of the cycloalkyl group of the optionally substituted cycloalkyl represented by $R^{14}$ include, but are not particularly limited to, $C_{3-30}$ cycloalkyl groups. Specific examples include monocyclic cycloalkyl groups, such as cyclopropyl, cyclobutyl, cyclopentyl, and cyclohexyl; and polycyclic cycloalkyl groups, such as tetrahydronaphthyl (hydrogenated naphthyl), norbornyl, and adamantyl. Of these, cyclohexyl is particularly preferable. The cycloalkyl may optionally further have one or more substituents, such as alkyl, cycloalkyl, and halogen.

Alkyl, cycloalkyl, and halogen as substituents are equal to the groups mentioned in (1-1) above for the polycarboxylic acid anhydride of two-component system.

When r represents 2 to 8, two $R^{14}$ groups may together form a divalent group. Examples of the divalent group include optionally substituted alkylene.

Examples of the alkylene group of the optionally substituted alkylene include, but are not particularly limited to, linear $C_{1-10}$ alkylene groups. Preferable examples include $C_{1-6}$ alkylene groups, such as methylene, ethylene, propylene, butylene, pentylene, and hexylene. Of these, methylene or ethylene is more preferable. The substituents are as listed above for $L_1$.

Here, x represents 1 or more, y represents 1 or more, and x+y is 2 or more. x+y is preferably 2 to 150, and more preferably 4 to 100. x represents the average number of polymer units, and is obtained by a gel permeation chromatography method (GPC).

The order of the sequence of units x and y is not limited to the order in the compound represented by Formula (6). The compound represented by Formula (4) and the cyclohexanedicarboxylic acid compound represented by Formula (7) may be block or randomly copolymerized. The structural unit represented by Formula (1) and the structural unit represented by Formula (5) may each be sequentially linked, or may be alternately or randomly linked.

The thus-obtained polycarboxylic acid anhydride of three-component system can exist as cis and trans isomers, depending on the configuration of two alcohol groups or two carboxyl groups. To exert the effects of the present invention, any of trans isomers, cis isomers, and mixtures thereof may be used.

The polycarboxylic acid anhydride of three-component system of the present invention has a number average molecular weight within a range of preferably 500 to 6000, and more preferably 2000 to 6000. The number average molecular weight is measured using well-known methods, such as gel permeation chromatography (GPC), and is calculated as a number average molecular weight (Mn) on a polystyrene basis.

The polycarboxylic acid anhydride of three-component system of the present invention has an acid anhydride equivalent within a range of preferably 300 to 5000 g/eq, more preferably 500 to 3000 g/eq, and particularly preferably 600 to 1500 g/eq. The acid anhydride equivalent is calculated using the equation shown in the Examples described later.

The polycarboxylic acid anhydride of three-component system of the present invention hardly undergoes volatilization at a temperature within a range in which epoxy resin is generally cured.

The polycarboxylic acid anhydride of three-component system of the present invention shows a characteristic peak from acid anhydride in the range of 1790 to 1835 $cm^1$, in particular in the range of 1800 to 1825 $cm^1$.

2. Method for Producing Polycarboxylic Acid Anhydride

The method for producing the polycarboxylic acid anhydride of the present invention is not particularly limited as long as a compound having the structural unit represented by Formula (1) above is obtained. The following describes a method for producing the polycarboxylic acid anhydride of two-component system described in (1-1) above or the polycarboxylic acid anhydride of three-component system described in (1-2) above.

(2-1) Method for Producing Polycarboxylic Acid Anhydride of Two-Component System The polycarboxylic acid anhydride of two-component system of the present invention is produced, for example, as shown in the following Reaction Formula 1.

Reaction Formula 1

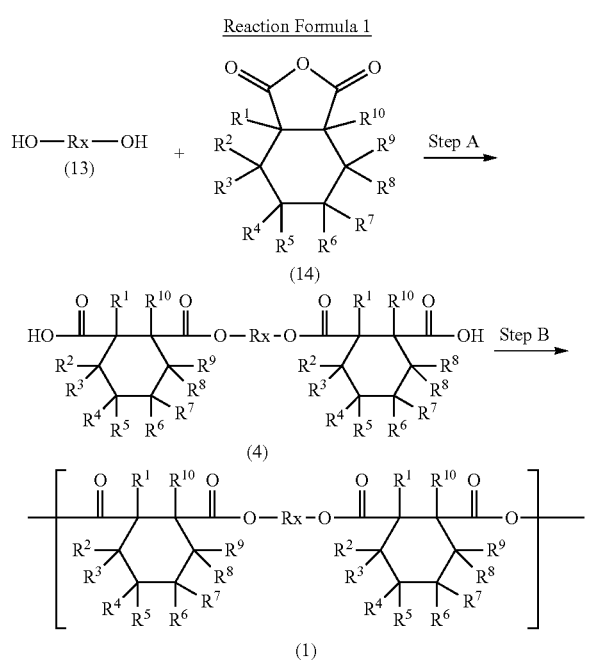

wherein Rx, and $R^1$ to $R^{10}$ are as defined above.

Specifically, the method for producing the polycarboxylic acid anhydride of two-component system of the present invention comprises reacting a diol compound represented by Formula (13) with a carboxylic acid anhydride represented by Formula (14) to obtain a dicarboxylic acid compound represented by Formula (4) (step A), and performing a condensation reaction in a reaction liquid containing the obtained compound (4) to produce a compound having the structural unit represented by Formula (1) (step B).

The condensation reaction in step B above may be performed in the presence of a condensation agent. When the reaction is performed in the presence of a condensation agent, a polycarboxylic acid anhydride compound represented by Formula (3):

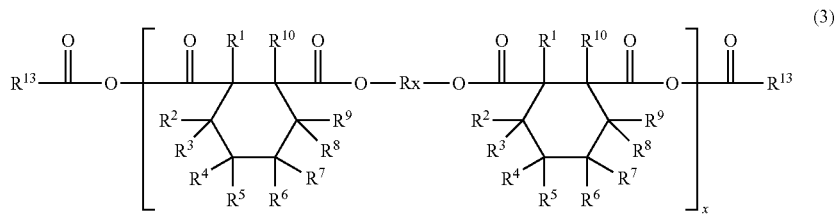

wherein Rx, $R^1$ to $R^{10}$, $R^{13}$, and x are as defined above, is produced.

Step A

In Step A, a diol compound represented by Formula (13) and a carboxylic acid anhydride represented by Formula (14) are reacted to produce a dicarboxylic acid compound represented by Formula (4).

The reaction of step A is not limited, and may be performed in accordance with a general method for reacting diol with carboxylic acid anhydride.

The reaction of step A is performed in an appropriate solvent, or under solvent-free conditions.

Examples of solvents, when used, include aromatic hydrocarbon-based solvents, such as benzene, toluene, and xylene; halogenated hydrocarbon-based solvents, such as dichloromethane, chloroform, and dichloroethane; amide-based solvents, such as N-methylpyrrolidone (NMP), N,N-dimethylacetamide, and N,N-dimethylformamide; ketone-based solvents, such as acetone, methyl ethyl ketone, methyl isobutyl ketone, diisobutyl ketone, 2-heptanone, 4-heptanone, 2-octanone, cyclopentanone, cyclohexanone, and acetylacetone; glycol ether-based solvents, such as ethylene glycol monobutyl ether, diethylene glycol monobutyl ether, propylene glycol monomethyl ether, propylene glycol monobutyl ether, dipropylene glycol dimethyl ether, and propylene glycol monomethyl ether acetate; ester-based solvents, such as γ-butyrolactone and butyl acetate; mixed solvents of these; and the like. Of these, cyclohexanone or propylene glycol monomethyl ether acetate is particularly preferable.

The amount of the solvent is generally 0 to 50 wt %, and preferably 10 to 30 wt %, per mole of the diol represented by Formula (13).

The amount of the compound (14) used may be suitably adjusted, and is, for example, generally 1.8- to 3-fold mol, and preferably 2.2-fold mol, relative to 1 mol of the diol represented by Formula (13).

The reaction temperature in step A varies depending on, for example, the types of the starting compounds used, and is not particularly limited. The reaction temperature is preferably within a range of 50 to 150° C., and more preferably 90 to 120° C.

The reaction time in step A varies depending on, for example, the reaction temperature and the types of the starting compounds used, and is not particularly limited. The reaction time is preferably within a range of 0.5 to 10 hours, and more preferably 1 to 5 hours.

Step B

In Step B, a condensation reaction is performed in a reaction liquid containing the compound (4) obtained in step A to produce a polycarboxylic acid anhydride.

The reaction in step B above may be performed in accordance with a general method for performing a condensation reaction of dicarboxylic acid.

The reaction of step B is performed in an appropriate solvent or under solvent-free conditions.

The type of the solvent used in step B may be the same as or different from the solvent used in step A.

When a solvent is used, the amount of the solvent used may be suitably adjusted, and is, for example, generally 0 to 500 wt %, and preferably 200 to 400 wt %, per mole of the dicarboxylic acid compound represented by Formula (4).

The condensation reaction in step B may be performed in the presence of a condensation agent. When the reaction is performed in the presence of a condensation agent, examples of the condensation agent include carboxylic anhydrides, such as acetic anhydride, propionic anhydride, and bis (cyclohexanecarboxylic acid)anhydride. Of these compounds, acetic anhydride is particularly preferable.

The amount of the condensation agent used may be suitably adjusted, and is, for example, generally 3- to 7-fold mol, and preferably 3- to 4-fold mol, relative to 1 mol of the compound represented by Formula (4).

Specifically, for example, when acetic anhydride is used as the condensation agent, in order to further promote the condensation reaction, the reaction is preferably performed while the acetic acid obtained as a by-product as the reaction proceeds is distilled off from the reaction system. When a solvent is used, the condensation reaction may be performed, for example, by a method comprising adding a solvent mentioned above dropwise to the reaction system while the acetic acid obtained as a by-product and the solvent are distilled off.

The reaction temperature in step B varies depending on, for example, the types of the starting compounds used, and is not particularly limited. The reaction temperature is preferably within a range of 50 to 150° C., and more preferably 90 to 120° C.

The reaction time in step B varies depending on, for example, the reaction temperature and the types of the starting compounds used, and is not particularly limited. The reaction time is preferably within a range of 0.5 to 20 hours, and more preferably 1 to 10 hours.

Step B may be performed after purification of the compound obtained through the reaction of step A above, or may be continuously performed after step A without purification.

(2-2) Method for Producing a Polycarboxylic Acid Anhydride of Three-Component System The polycarboxylic acid anhydride of three-component system of the present invention is produced as shown in the following Reaction Formula 2.

Reaction Formula 2

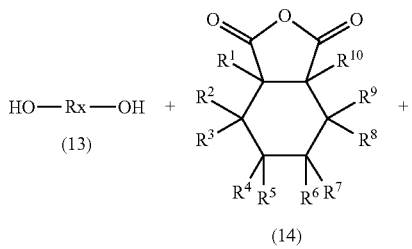

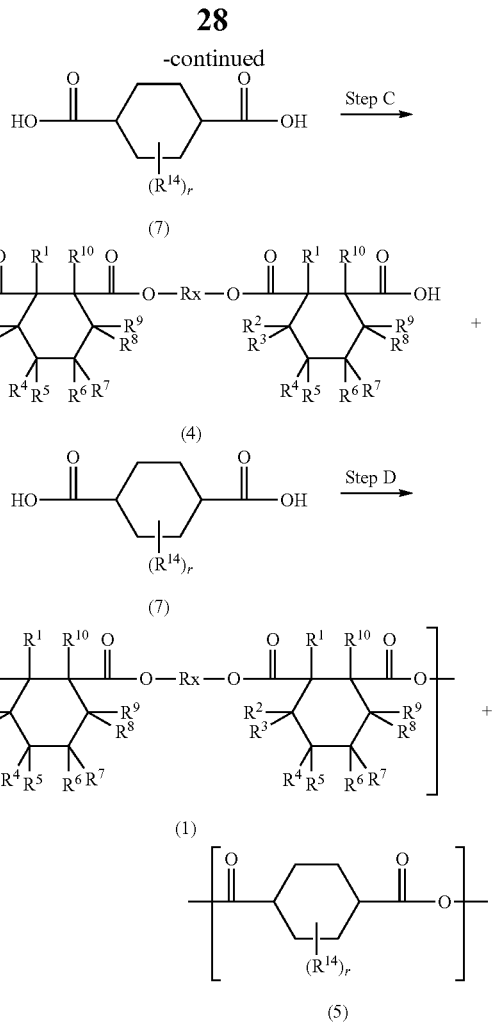

wherein Rx, $R^1$ to $R^{10}$, $R^{14}$, and r are as defined above.

The polycarboxylic acid anhydride of three-component system of the present invention may be produced, for example, by i) placing compound (13), compound (14), and compound (7) into a reaction system all at once, and performing steps C and D (Reaction Formula 2); or by ii) reacting compound (13) with compound (14) to first obtain compound (4) (step A of Reaction Formula 1), and then reacting the obtained compound (4) with compound (7) (step D).

The reaction in step D may be performed in the presence of a condensation agent. When the reaction is performed in the presence of a condensation agent, a polycarboxylic acid anhydride compound represented by Formula (6) is produced:

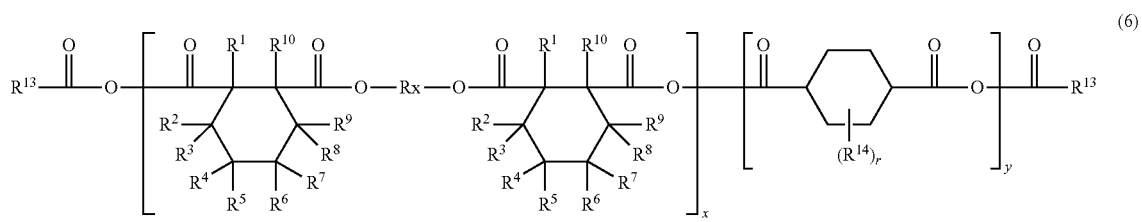

wherein Rx, $R^1$ to $R^{10}$, $R^{13}$, $R^{14}$, r, x, and y are as defined above.

Step C

In Step C, a diol compound represented by Formula (13), a carboxylic acid anhydride represented by Formula (14), and a cyclohexanedicarboxylic acid compound represented by Formula (7) are reacted to obtain a mixture of a dicarboxylic acid compound represented by Formula (4) and a cyclohexanedicarboxylic acid compound represented by Formula (7).

In the reaction of step C, compound (13) and compound (14) are first reacted to obtain a mixture of compound (4) and compound (7).

Therefore, after performing step A shown in Reaction Formula 1, the obtained compound (4) may be reacted with compound (7).

The reaction of step C is performed in an appropriate solvent, or under solvent-free conditions.

The solvent used in step C may be of the same type as that of the solvent mentioned in step A above.

When a solvent is used, the amount of the solvent used may be suitably adjusted, and is, for example, generally 0 to 50 wt %, and preferably 10 to 30 wt %, per mole of the dicarboxylic acid compound represented by Formula (4).

The reaction temperature varies depending on, for example, the types of the starting compounds used, and is not particularly limited. The reaction temperature is preferably within a range of 50 to 150° C., and more preferably 90 to 120° C.

The reaction time varies depending on, for example, the reaction temperature and the types of the starting compounds used, and is not particularly limited. The reaction time is preferably within a range of 0.5 to 10 hours, and more preferably 1 to 5 hours.

Step D

In Step D, a dicarboxylic acid compound represented by Formula (4) and a cyclohexanedicarboxylic acid compound represented by Formula (7) are subjected to a condensation reaction to produce a polycarboxylic acid anhydride having the structural unit represented by Formula (1) and the structural unit represented by Formula (5).

The reaction of step D is performed in accordance with a general method for performing a condensation reaction of dicarboxylic acid, and the reaction is performed in a solvent or under solvent-free conditions. The type of the solvent used in step D may be the same as or different from the solvent used in step C.

When a solvent is used, the amount of the solvent used may be suitably adjusted, and is, for example, generally 0 to 500 parts by weight, and preferably 200 to 400 parts by weight, per mole of the dicarboxylic acid compound represented by Formula (4).

The condensation reaction in step D may be performed in the presence of a condensation agent. When the reaction is performed in the presence of a condensation agent, examples of the condensation agent include carboxylic anhydrides, such as acetic anhydride, propionic anhydride, and bis (cyclohexanecarboxylic acid)anhydride. Of these compounds, acetic anhydride is particularly preferable.

The amount of the condensation agent used may be suitably adjusted, and is, for example, generally 6- to 10-fold mol, and preferably 6- to 8-fold mol, relative to 1 mol of the compound represented by Formula (4).

Specifically, for example, when acetic anhydride is used as the condensation agent, in order to further promote the condensation reaction, the reaction is preferably performed while the acetic acid obtained as a by-product as the reaction proceeds is distilled off from the reaction system. When a solvent is used, the condensation reaction may be performed, for example, by a method comprising adding a solvent mentioned above dropwise to the reaction system while the acetic acid obtained as a by-product and the solvent are distilled off.

The feed molar ratio of the cyclohexanedicarboxylic acid represented by Formula (7) above to the compound represented by Formula (4) above is preferably within a range of 0.1:99.9 to 70:30, and more preferably 10:90 to 55:45.

The reaction temperature varies depending on, for example, the types of the starting compounds used, and is not particularly limited. The reaction temperature is preferably within a range of 50 to 150° C., and more preferably 90 to 120° C.

The reaction time varies depending on, for example, the reaction temperature and the types of the starting compounds used, and is not particularly limited. The reaction time is preferably within a range of 0.5 to 20 hours, and more preferably 1 to 10 hours.

Step D may be performed after purification of the compound obtained through the reaction of step C above, or may be continuously performed after step C without purification.

The reactions of Reaction Formula 1 and Reaction Formula 2 may be performed at ordinary pressure, reduced pressure, or elevated pressure. The atmosphere when the reaction above is performed is not limited as long as the reaction is not inhibited. The reaction may be performed in any of, for example, air atmosphere, nitrogen atmosphere, and argon atmosphere. The reactions above may be performed by any method (e.g., batch, semi-batch, or continuous).

Each compound obtained in Reaction Formula 1 and Reaction Formula 2 is obtained by separation and purification of the reaction mixture by means of, for example, filtration, concentration, extraction, crystallization, recrystallization, or column chromatography, or by a mixture of these means.

The polycarboxylic acid anhydride of the present invention may also be used as a solvent-containing composition for various applications, without performing separation and purification.

Epoxy Resin-Curing Agent

The epoxy resin-curing agent according to the present invention contains the polycarboxylic acid anhydride described above.

The polycarboxylic acid anhydride can be used alone as a curing agent for epoxy resin. According to a preferable embodiment, however, the polycarboxylic acid anhydride is used as a curing agent for epoxy resin after being mixed with a cure accelerator.

The epoxy resin-curing agent according to the present invention may be used alone, or in a combination of two or more.

The epoxy resin-curing agent according to the present invention may be used in a state in which it is dissolved in a solvent. In this case, to obtain an excellent film, the concentration of the polycarboxylic acid anhydride is preferably 5 to 60 wt %, and furthermore preferably 10 to 50 wt %.

Epoxy Resin Composition

The epoxy resin composition according to the present invention contains a polycarboxylic acid anhydride-containing epoxy resin-curing agent (a), an epoxy resin (b), and a cure accelerator (c).

The polycarboxylic acid anhydride-containing epoxy resin-curing agent (a) is a component described in the section "Polycarboxylic Acid Anhydride" above.

The epoxy resin composition according to the present invention may be used in combination with a well-known epoxy resin-curing agent (e.g., carboxylic acid or acid anhydride thereof) other than the polycarboxylic acid anhydride-containing epoxy resin-curing agent (a), if necessary.

The epoxy resin (b) blended in the epoxy resin composition according to the present invention may be a hitherto known epoxy resin. Examples thereof include, but are not limited to, bisphenol A-type epoxy resin, bisphenol F-type epoxy resin, bisphenol S-type epoxy resin, phenol novolac-type epoxy resin, cresol novolac-type epoxy resin, cycloaliphatic epoxy resin, hydrogenated-bisphenol A-type epoxy resin, hydrogenated-bisphenol A-diglycidylether-type epoxy resin, hydrogenated-bisphenol AD-type epoxy resin, hydrogenated-bisphenol AD-type diglycidyl ether epoxy resin, propylene glycol diglycidyl ether, pentaerythritol polyglycidyl ether, and like aliphatic-based epoxy resins; 1,3,5-tris(2,3-epoxypropyl)-1,3,5-triazine-2,4,6(1H,3H,5H)-trione and like triazine-type epoxy resins; epoxy resins consisting of aliphatic or aromatic carboxylic acid, and epichlorohydrin; heterocyclic epoxy resins; spiro ring-containing epoxy resins; epoxy-containing acrylic resins; epoxy modified resins; and various epoxy resins. These epoxy resins may be used singly, or in a combination of two or more.

Examples of particularly recommended epoxy resins include bisphenol A-type epoxy resin, hydrogenated bisphenol A-type diglycidylether epoxy resin, bisphenol A-type epoxy resin, 1,3,5-tris(2,3-epoxypropyl)-1,3,5-triazine-2,4,6(1H,3H,5H)-trione, and the like.

In the epoxy resin-curing agent, the ratio of the acid anhydride group of the curing agent (a) with respect to one epoxy group of the epoxy resin (b) (equivalent ratio of acid anhydride group/epoxy group) is preferably within a range of 0.8 to 1.2, and more preferably 0.9 to 1.1.

The cure accelerator (c) blended in the epoxy resin composition of the present invention may be a hitherto known cure accelerator (curing catalyst). Examples thereof include tertiary amine compounds, such as triethylamine, N,N-dimethylbenzylamine, N,N-dimethylaniline, and tris(dimethylamino methyl)phenol; imidazole compounds, such as 2-undecylimidazole, 2-heptadecylimidazole, and 1-cyanoethyl-2-undecylimidazole; quaternary ammonium salts, such as tetraethylammonium bromide and tetrabutylammonium bromide; organic metal compounds, such as zinc acetate, sodium acetate, zinc octylate, tin octylate, aluminum acetylacetone; organic phosphorus-based compounds, such as triphenylphosphine and triphenylphosphite; and the like.

These cure accelerators may be used singly, or in a combination of two or more. Of these cure accelerators, tertiary amine compounds and organic phosphorus-based compounds are preferable.

The amount of the cure accelerator (c) blended in the epoxy resin composition of the present invention is 0.1 to 5 parts by weight, and preferably 0.5 to 2 parts by weight, based on 100 parts by weight of the epoxy resin (b). The use of the cure accelerator in an amount of 0.5 parts by weight or more makes it possible to further shorten the time for curing.

The epoxy resin composition of the present invention optionally suitably contains other additives to such an extent that the effects of the present invention are not impaired. Examples of the additives include an ultraviolet absorber, an antioxidant agent, a light stabilizer, a pigment, a dye, a filler, a flame-retarding agent, a flow-regulating agent, a leveling agent, a surface tension adjuster, a tackifier, a coupling agent, a defoaming agent, an antistatic agent, a solvent, and the like.

When used, these optional additives may be used in an amount within a range that is generally used, as long as the effects of the present invention are not impaired. The amount is, for example, 10 parts by weight or less based on 100 parts by weight of the sum of the curing agent (a), the epoxy resin (b), and the cure accelerator (c).

The epoxy resin composition of the present invention may be produced by mixing and stirring the predetermined amounts of the polycarboxylic acid anhydride-containing epoxy resin-curing agent (a), the epoxy resin (b), and the cure accelerator (c), and optionally other additives, by using a known means.

Each component of the epoxy resin-curing agent, the epoxy resin, the cure accelerator, and other additives may be added at once, or gradually added in several portions.

The optional additives may be mixed by addition at any stage; for example, the optional additives may be mixed at the time of mixing the curing agent with the cure accelerator, before the addition of the epoxy resin, at the time of addition of the epoxy resin, or after the addition of the epoxy resin.

The epoxy resin composition of the present invention has a gel time at 140° C. of within a range of preferably 100 to 500 seconds, and more preferably 200 to 400 seconds.

According to the resin composition of the present invention, the polycarboxylic acid anhydride itself does not undergo volatilization. Therefore, even when an epoxy resin is used and heat-cured, the balance of the composition of the resin composition remains stable.

Epoxy Resin Molded Article

The epoxy resin molded article (cured product) of the present invention is produced by using an epoxy resin composition containing a polycarboxylic acid anhydride-containing epoxy resin-curing agent (a), an epoxy resin (b), and a cure accelerator (c), and optionally other additives.

The thus-obtained epoxy resin molded article (cured product) of the present invention has a high glass transition temperature (Tg), as well as excellent initial transparency, thermal yellowing resistance, surface hardness, alkali resistance, solvent resistance, flexibility, and adhesiveness. The epoxy resin molded article of the present invention is thus suitable for forming, in particular, a thin film, which requires curing at a relatively high temperature.

Examples of the method for producing a thin film from the epoxy resin composition of the present invention include a method comprising applying the composition to a substrate, and curing the film to obtain a film having, in particular, a thickness of 1 mm or less. The film thickness is preferably about 0.3 mm or less. The lower limit of the film thickness is generally about 0.001 mm.

Examples of the substrate include, but are not particularly limited to, glasses, ceramics, aluminum, CCLs (copper-clad laminates), heat-resistant polymer films, and the like.

The method of applying the epoxy resin composition of the present invention to a substrate is not particularly limited, and any hitherto known methods may be used without limitation. Examples include known methods, such as screen printing, die coater, comma coater, roll coater, bar coater, gravure coater, curtain coater, spray coater, air knife coater, reverse coater, and dip-squeeze coater.

The method of curing a film is not particularly limited, and known methods may be used. For curing, hitherto known curing equipment may be used, such as a closed curing furnace or a tunnel furnace capable of continuous curing. For heating, a hitherto known method may be used, such as hot-air circulation, infrared heating, or high-frequency heating.

The curing may be performed at a temperature of about 120 to 200° C. for a duration of about 5 minutes to 5 hours. In particular, the curing is preferably performed at about 120 to 180° C. for about 10 minutes to 3 hours.

The epoxy resin molded article (cured product) of the present invention has a glass transition temperature (Tg) of preferably 80 to 200° C., and more preferably 110 to 200° C. The glass transition temperature may be measured using a differential scanning calorimetry (DSC) method.

The epoxy resin molded article (cured product) of the present invention preferably has a high permeability within the wavelength region of visible light to near-ultraviolet light. With respect to the epoxy resin molded article of the present invention, the initial transparency (YI) and the thermal yellowing resistance (ΔYI) after heat treatment at 150° C. for 5 days can be calculated based on a reflectance measured using a spectrocolorimeter (CM-5 (produced by Konica Minolta Co., Ltd.)).

YI represents the degree of yellowing in the molded article. A smaller value indicates more excellent colorlessness and transparency, and a larger value represents more yellowing. ΔYI represents the degree of yellowing after thermal hysteresis, i.e., thermal yellowing resistance. A smaller value indicates a more excellent thermal yellowing resistance of the cured product.

YI is preferably within a range of −0.5 to 3, and more preferably −0.5 to 2. ΔYI is preferably within a range of 0 to 4, and more preferably 0 to 3.5.

The epoxy resin molded article (cured product) of the present invention preferably has a pencil hardness measured in accordance with JIS K 5600-5-4 (ver. Apr. 20, 1999) of HB or higher, and more preferably H or higher.

The epoxy resin molded article (cured product) of the present invention has excellent alkali resistance, solvent resistance, flexibility, and adhesiveness.

Use

The epoxy resin-curing agent of the present invention, the epoxy resin molded article of the present invention, or the epoxy resin composition of the present invention may be used in various fields where thermosetting resins can be used. Examples include an adhesive agent, a coating composition, an ink, toner, a coating agent, a molding material (including, for example, a seat, a film, and FRP), an electrical insulation material (including, for example, a printed circuit board, and a wire covering), a semiconductor-sealing material, a resist material, a plasticizer, a lubricant, a fiber treatment agent, a surfactant, a medicine, an agricultural chemical, and the like.

The epoxy resin molded article above has excellent transparency and thermal yellowing resistance, and is thus suitably used as various glass substrates, automotive components, transparent hard coating materials of a liquid crystal display, a plasma display, and other display devices. It is important for a liquid crystal display to have resistance to yellowing that occurs due to high backlight temperature. Therefore, the epoxy resin composition of the present invention is suitably used as a coating material for a liquid crystal display. Accordingly, the epoxy resin molded article of the present invention is also useful as a coating material for display.

EXAMPLES

Examples and Comparative Examples are shown below to describe the present invention in more detail. However, the present invention is not limited to these Examples. The abbreviations of the compounds in the Examples and Comparative Examples are shown below.

Abbreviations of Compounds
Acid Anhydride
RIKACID HH: hexahydrophthalic anhydride (produced by New Japan Chemical Co., Ltd.)
RIKACID MH-T: 4-methylhexahydrophthalic anhydride (produced by New Japan Chemical Co., Ltd.)
RIKACID HNA-100: a mixture of methylbicyclo[2.2.1]heptane-2,3-dicarboxylic anhydride and bicyclo[2.2.1]heptane-2,3-dicarboxylic anhydride (produced by New Japan Chemical Co., Ltd.)
Dicarboxylic Acid Compound
CHDA: 1,4-cyclohexanedicarboxylic acid (produced by New Japan Chemical Co., Ltd.)
Alcohols
RIKABINOL HB: hydrogenated bisphenol A (produced by New Japan Chemical Co., Ltd.)
27-DH: decahydro-2,7-naphthalenediol (produced by Sugai Chemical Industry Co., Ltd.)
1,4-CHD: 1,4-cyclohexanediol (produced by Tokyo Chemical Industry Co., Ltd.)
BHD: 1,1-bicyclohexyl-4,4-diol (produced by Tokyo Chemical Industry Co., Ltd.)
1,6-HD: 1,6-hexanediol (produced by Wako Pure Chemical Industries, Ltd.)
BEPD: 2-butyl-2-ethyl-1,3-propanediol (produced by KH Neochem Co., Ltd.)
NPG: neopentylglycol (produced by Mitsubishi Gas Chemical Company, Inc.)
CHDM: 1,4-cyclohexanedimethanol (produced by New Japan Chemical Co., Ltd.)
Solvent
CHN: cyclohexanone (produced by Nacalai Tesque, Inc.)
PGMEA: propylene glycol monomethyl ether acetate (produced by KH Neochem Co., Ltd.)
Epoxy Resin
jER828: bisphenol A-type epoxy resin (produced by Mitsubishi Chemical Corporation)
HBE-100: hydrogenated bisphenol A-type diglycidylether epoxy resin (produced by New Japan Chemical Co., Ltd.)
Cure Accelerator
TBP-BB: tetrabutylphosphonium bromide (produced by Hokko Chemical Industry Co., Ltd.)

Example 1

(1) 17.6 g of RIKABINOL HB (73.0 mmol) and 22.5 g of RIKACID HH (146.0 mmol, which is 2.0-fold mmol with respect to RIKABINOL HB) were added to 15.0 g of CHN, and the resulting product was stirred at 110° C. for 3 hours under nitrogen stream to obtain a CHN solution of dicarboxylic acid compound (HB/HH).

(2) 26.1 g of acetic anhydride (255.5 mmol, which is 3.5-fold mmol with respect to RIKABINOL HB) was added to the above dicarboxylic acid compound solution and stirred at 100° C. for 1 hour under nitrogen stream. The pressure inside the reactor was gradually reduced to 10.7 to 13.3 kPa. Then, CHN was added dropwise to the reactor at a rate of 60 mL/h, and the condensation reaction was allowed to proceed at 100° C. over 5 hours, while acetic acid produced as a by-product was distilled off, together with CHN, from the reaction system at a rate of 60 mL/h. In this manner, a solution of the polycarboxylic acid anhydride of the present invention was obtained. Thereafter, the solution was diluted with CHN so that the polycarboxylic acid anhydride was 40 wt %. Using the obtained polycarboxylic acid anhydride solution, the number average molecular weight, the volatility at the time of heating, and the acid anhydride equivalent were measured. Table 1 shows the results. The infrared absorption spectrum (FT-IR) of the polycarboxylic acid anhydride obtained in (2) was measured by the following method.

Infrared Absorption Spectrum (FT-IR)

The polycarboxylic acid anhydride solution obtained in Example 1 was vacuum-dried, and the solvent was distilled off. Thereafter, a flaky solid polycarboxylic acid anhydride was obtained. Table 1 shows the spectrum of this polycarboxylic acid anhydride measured by FT-IR.

IR: 2939 $cm^{-1}$, 2861 $cm^{-1}$, 1813 $cm^{-1}$, 1722 $cm^{-1}$, 1449 $cm^{-1}$, 1299 $cm^{-1}$, 1185 $cm^{-1}$, and 993 $cm^{-1}$ FIG. 1 shows a peak of an acid anhydride group (1813 $cm^{-1}$), indicating that a target polycarboxylic acid anhydride was obtained.

Example 2

A solution of the polycarboxylic acid anhydride of the present invention was obtained as in Example 1, except that 12.4 g of 27-DH (73.0 mmol) was used in place of 17.6 g of RIKABINOL HB (73.0 mmol). Thereafter, the solution was diluted with CHN so that the polycarboxylic acid anhydride was 40 wt %. Using the obtained polycarboxylic acid anhydride solution, the number average molecular weight, the volatility at the time of heating, and the acid anhydride equivalent were measured. Table 1 shows the results. The obtained polycarboxylic acid anhydride solution was vacuum-dried, and the solvent was distilled off. Thereafter, a flaky solid polycarboxylic acid anhydride was obtained. Table 2 shows the spectrum of this polycarboxylic acid anhydride measured by FT-IR.

Figure 2:
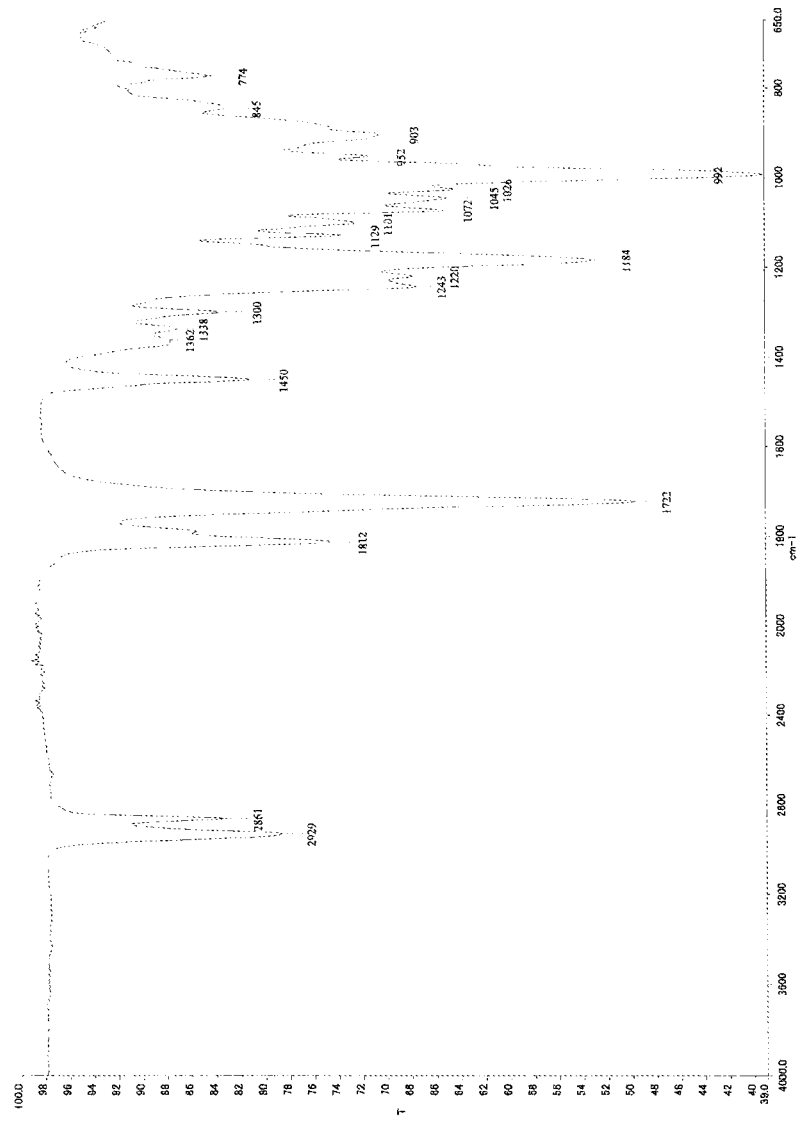
FIG. 2 is an infrared absorption spectrum of a polycarboxylic acid anhydride obtained by drying the polycarboxylic acid anhydride solution obtained in Example 2, and distilling off the solvent.

IR: 2929 $cm^{-1}$, 2861 $cm^{-1}$, 1812 $cm^{-1}$, 1722 $cm^{-1}$, 1450 $cm^{-1}$, 1300 $cm^{-1}$, 1184 $cm^{-1}$, and 992 $cm^{-1}$ FIG. 2 shows a peak of an acid anhydride group (1812 $cm^{-1}$), indicating that a target polycarboxylic acid anhydride was obtained.

Example 3

13.3 g of RIKABINOL HB (55.3 mmol), 17.1 g of RIKACID HH (110.6 mmol, which is 2.0-fold mmol with respect to RIKABINOL HB), and 9.5 g of CHDA (55.3 mmol, which is 1.0-fold mmol with respect to RIKABINOL HB) were added to 15.0 g of PGMEA, and the resulting product was stirred at 110° C. for 3 hours under nitrogen stream to obtain a PGMEA solution of dicarboxylic acid compound (HB/HH). 39.5 g of acetic anhydride (387.3 mmol, which is 7.0-fold mmol with respect to RIKABINOL HB) was added to the dicarboxylic acid compound solution above and stirred at 100° C. for 1 hour under nitrogen stream. The pressure inside the reactor was gradually reduced to 10.7 to 13.3 kPa. Then, CHN was added dropwise to the reactor at a rate of 60 mL/h, and the condensation reaction was allowed to proceed at 100° C. over 5 hours, while acetic acid produced as a by-product was distilled off, together with CHN, from the reaction system at a rate of 60 mL/h. In this manner, a solution of the polycarboxylic acid anhydride of the present invention was obtained. Thereafter, the solution was diluted with PGMEA so that the polycarboxylic acid anhydride was 40 wt %. Using the obtained polycarboxylic acid anhydride solution, the number average molecular weight, the volatility at the time of heating, and the acid anhydride equivalent were measured. Table 1 shows the results. The obtained polycarboxylic acid anhydride solution was vacuum-dried, and the solvent was distilled off. Thereafter, a flaky solid polycarboxylic acid anhydride was obtained. Table 3 shows the spectrum of this polycarboxylic acid anhydride measured by FT-IR.

Figure 3:
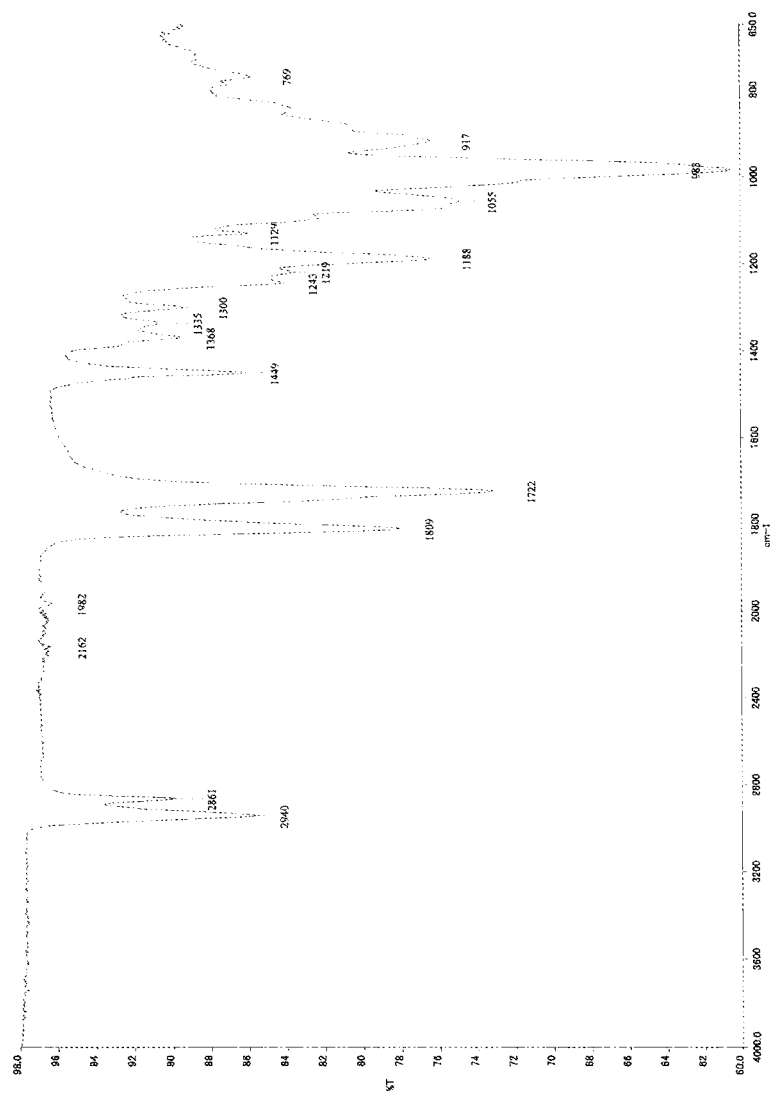
FIG. 3 is an infrared absorption spectrum of a polycarboxylic acid anhydride obtained by drying the polycarboxylic acid anhydride solution obtained in Example 3, and distilling off the solvent.

IR: 2940 $cm^{-1}$, 2861 $cm^{-1}$, 1809 $cm^{-1}$, 1722 cm, 1449 $cm^{-1}$, 1300 $cm^{-1}$, 1188 $cm^{-1}$, and 983 $cm^{-1}$ FIG. 3 shows a peak of an acid anhydride group (1809 $cm^{-1}$), indicating that a target polycarboxylic acid anhydride was obtained.

Example 4

A solution of the polycarboxylic acid anhydride of the present invention was obtained as in Example 3, except that 9.4 g of 27-DH (55.3 mmol) was used in place of 13.3 g of RIKABINOL HB (55.3 mmol). Thereafter, the solution was diluted with PGMEA so that the polycarboxylic acid anhydride was 40 wt %. Using the obtained polycarboxylic acid anhydride solution, the number average molecular weight, the volatility at the time of heating, and the acid anhydride equivalent were measured. Table 1 shows the results. The obtained polycarboxylic acid anhydride solution was vacuum-dried, and the solvent was distilled off. Thereafter, a flaky solid polycarboxylic acid anhydride was obtained. Table 4 shows the spectrum of this polycarboxylic acid anhydride measured by FT-IR.

Figure 4:
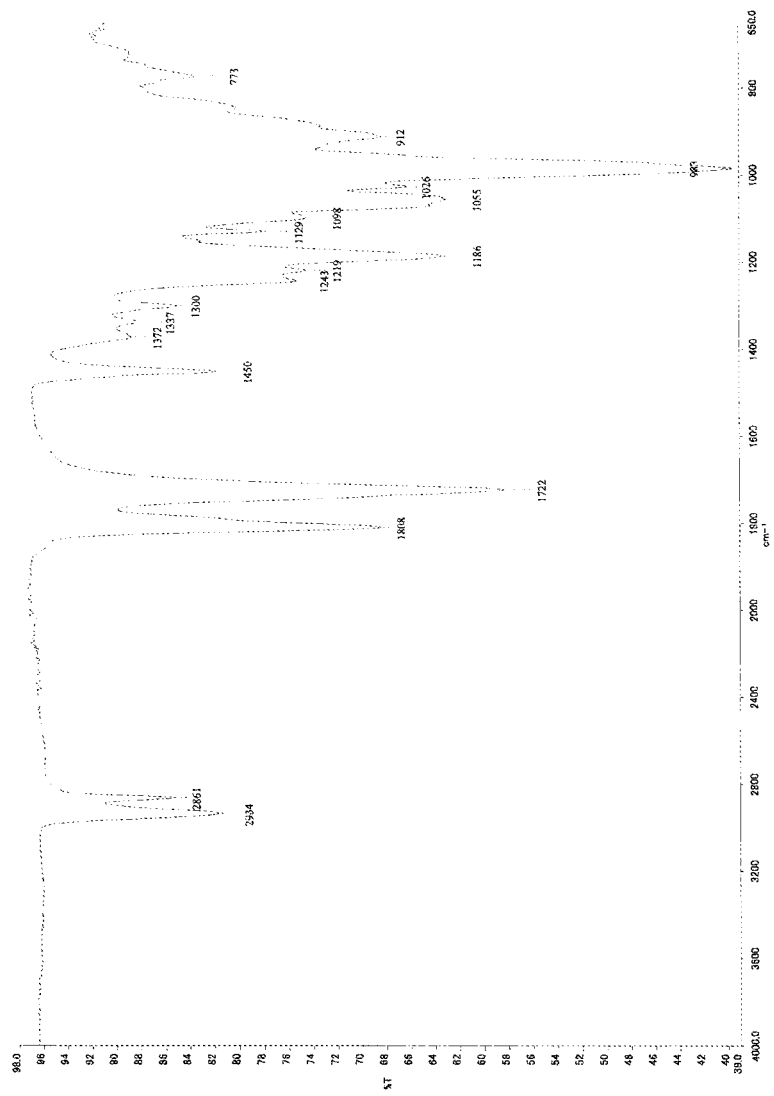
FIG. 4 is an infrared absorption spectrum of a polycarboxylic acid anhydride obtained by drying the polycarboxylic acid anhydride solution obtained in Example 4, and distilling off the solvent.

IR: 2934 $cm^{-1}$, 2861 $cm^{-1}$, 1808 $cm^{-1}$, 1722 $cm^{-1}$, 1450 $cm^{-1}$, 1300 $cm^{-1}$, 1186 $cm^{-1}$, and 983 $cm^{-1}$ FIG. 4 shows a peak of an acid anhydride group (1808 $cm^{-1}$), indicating that a target polycarboxylic acid anhydride was obtained.

Example 5

A solution of the polycarboxylic acid anhydride of the present invention was obtained as in Example 3, except that 18.6 g of RIKACID MH-T (110.6 mmol) was used in place of 17.1 g of RIKACID HH (110.6 mmol). Thereafter, the solution was diluted with PGMEA so that the polycarboxylic acid anhydride was 40 wt %. Using the obtained polycarboxylic acid anhydride solution, the number average molecular weight, the volatility at the time of heating, and the acid anhydride equivalent were measured. Table 1 shows the results. The obtained polycarboxylic acid anhydride solution was vacuum-dried, and the solvent was distilled off. Thereafter, a flaky solid polycarboxylic acid anhydride was obtained. Table 5 shows the spectrum of this polycarboxylic acid anhydride measured by FT-IR.

Figure 5:
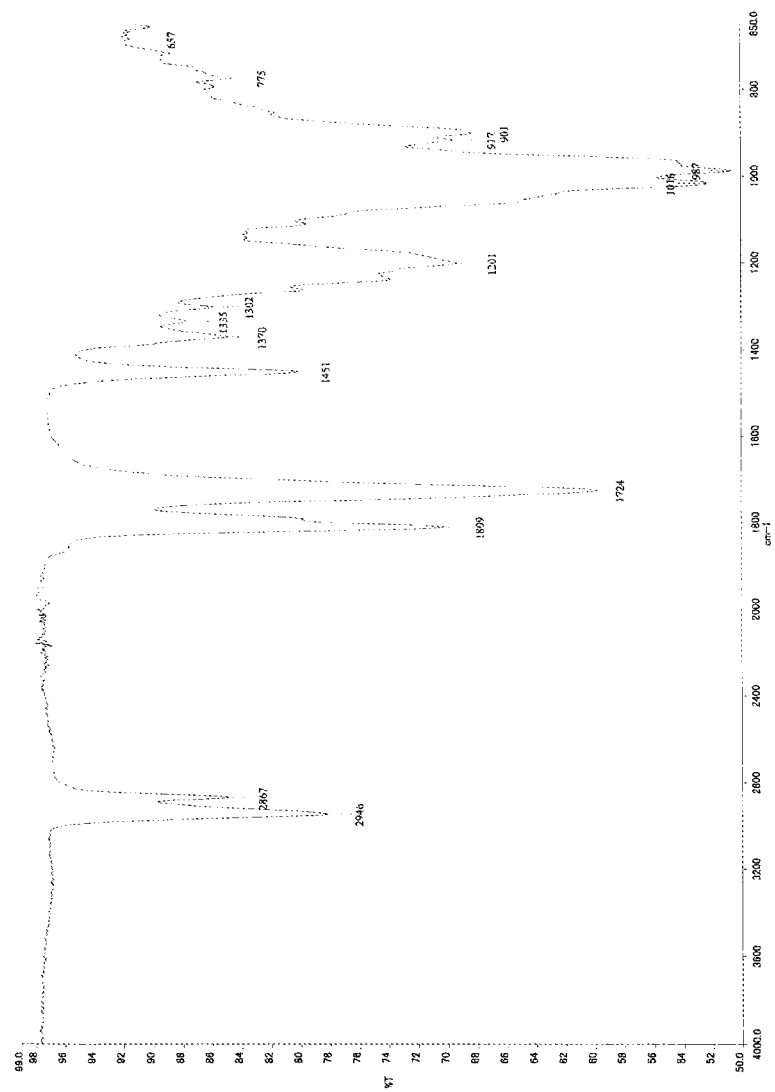
FIG. 5 is an infrared absorption spectrum of a polycarboxylic acid anhydride obtained by drying the polycarboxylic acid anhydride solution obtained in Example 5, and distilling off the solvent.

IR: 2946 $cm^{-1}$, 2867 $cm^{-1}$, 1809 $cm^{-1}$, 1724 $cm^{-1}$, 1451 $cm^{-1}$, 1302 $cm^{-1}$, 1201 $cm^{-1}$, and 987 $cm^{-1}$ FIG. 5 shows a peak of an acid anhydride group (1809 $cm^{-1}$), indicating that a target polycarboxylic acid anhydride was obtained.

Example 6

A solution of the polycarboxylic acid anhydride of the present invention was obtained as in Example 3, except that 6.4 g of 1,4-CHD (55.3 mmol) was used in place of 13.3 g of RIKABINOL HB (55.3 mmol). Thereafter, the solution was diluted with PGMEA so that the polycarboxylic acid anhydride was 40 wt %. Using the obtained polycarboxylic acid anhydride solution, the number average molecular weight, the volatility at the time of heating, and the acid anhydride equivalent were measured. Table 1 shows the results. The obtained solution of polycarboxylic acid anhydride was vacuum-dried, and the solvent was distilled off.

Thereafter, a flaky solid polycarboxylic acid anhydride was obtained. Table 6 shows the spectrum of this polycarboxylic acid anhydride measured by FT-IR.

Figure 6:
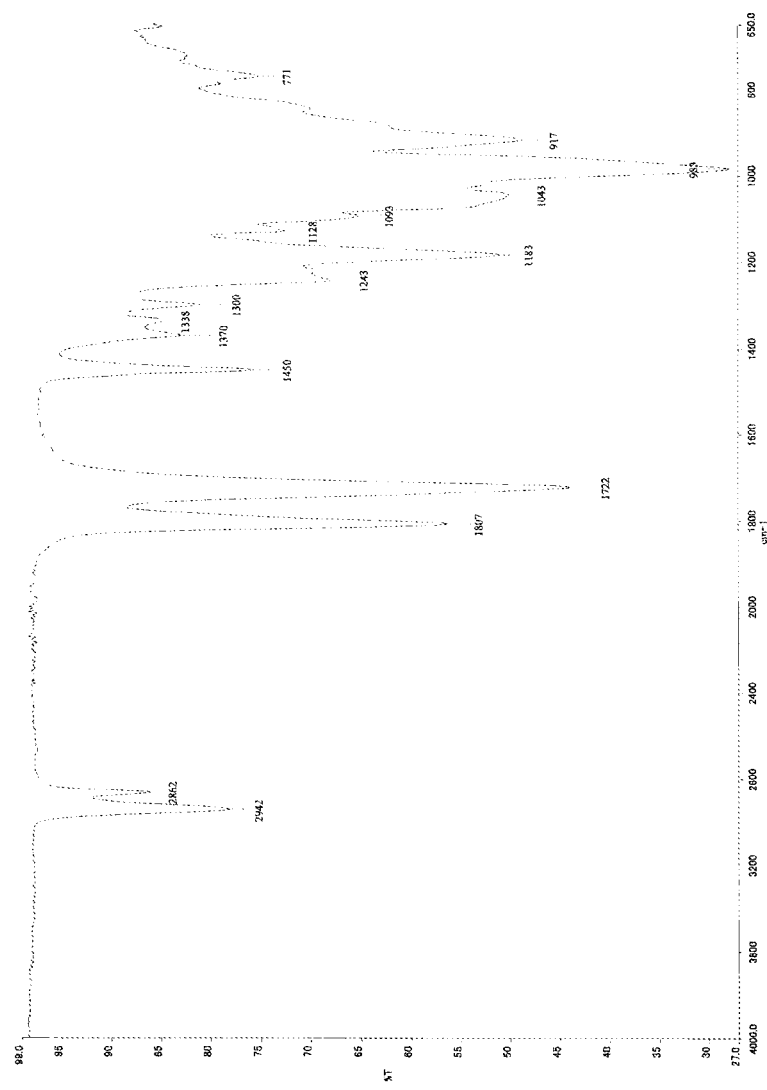
FIG. 6 is an infrared absorption spectrum of a polycarboxylic acid anhydride obtained by drying the polycarboxylic acid anhydride solution obtained in Example 6, and distilling off the solvent.

IR: 2942 cm$^{-1}$, 2862 cm$^{-1}$, 1807 cm$^{-1}$, 1722 cm$^{-1}$, 1450 cm$^{-1}$, 1300 cm$^{-1}$, 1183 cm$^{-1}$, and 983 cm$^{-1}$ FIG. 6 shows a peak of an acid anhydride group (1807 cm$^{-1}$), indicating that a target polycarboxylic acid anhydride was obtained.

Example 7

A solution of the polycarboxylic acid anhydride of the present invention was obtained as in Example 6, except that 18.6 g of RIKACID MH-T (110.6 mmol) was used in place of 17.1 g of RIKACID HH (110.6 mmol). Thereafter, the solution was diluted with PGMEA so that the polycarboxylic acid anhydride was 40 wt %. Using the obtained polycarboxylic acid anhydride solution, the number average molecular weight, the volatility at the time of heating, and the acid anhydride equivalent were measured. Table 1 shows the results. The obtained polycarboxylic acid anhydride solution was vacuum-dried, and the solvent was distilled off. Thereafter, a flaky solid polycarboxylic acid anhydride was obtained. Table 7 shows the spectrum of this polycarboxylic acid anhydride measured by FT-IR.

Figure 7:
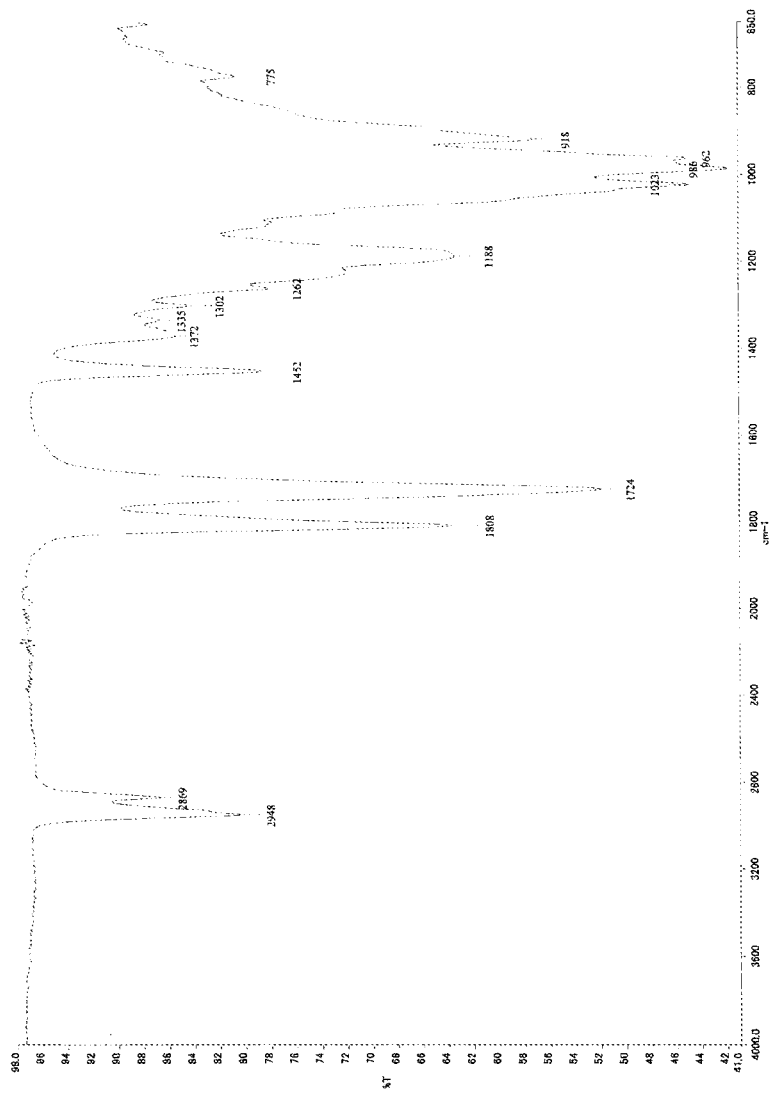
FIG. 7 is an infrared absorption spectrum of a polycarboxylic acid anhydride obtained by drying the polycarboxylic acid anhydride solution obtained in Example 7, and distilling off the solvent.

IR: 2948 cm$^{-1}$, 2869 cm$^{-1}$, 1808 cm$^{-1}$, 1724 cm$^{-1}$, 1452 cm$^{-1}$, 1302 cm$^{-1}$, 1188 cm$^{-1}$, and 986 cm$^{-1}$ FIG. 7 shows a peak of an acid anhydride group (1808 cm$^{-1}$), indicating that a target polycarboxylic acid anhydride was obtained.

Example 8

A solution of the polycarboxylic acid anhydride of the present invention was obtained as in Example 3, except that 11.0 g BHD (55.3 mmol) was used in place of 13.3 g of RIKABINOL HB (55.3 mmol). Thereafter, the solution was diluted with PGMEA so that the polycarboxylic acid anhydride was 40 wt %. Using the obtained polycarboxylic acid anhydride solution, the number average molecular weight, the volatility at the time of heating, and the acid anhydride equivalent were measured. Table 1 shows the results.

Example 9

A solution of the polycarboxylic acid anhydride of the present invention was obtained as in Example 8, except that 18.6 g of RIKACID MH-T (110.6 mmol) was used in place of 17.1 g of RIKACID HH (110.6 mmol). Thereafter, the solution was diluted with PGMEA so that the polycarboxylic acid anhydride was 40 wt %. Using the obtained polycarboxylic acid anhydride solution, the number average molecular weight, the volatility at the time of heating, and the acid anhydride equivalent were measured. Table 1 shows the results. The obtained polycarboxylic acid anhydride solution was vacuum-dried, and the solvent was distilled off. Thereafter, a flaky solid polycarboxylic acid anhydride was obtained. Table 8 shows the spectrum of this polycarboxylic acid anhydride measured by FT-IR.

Figure 8:
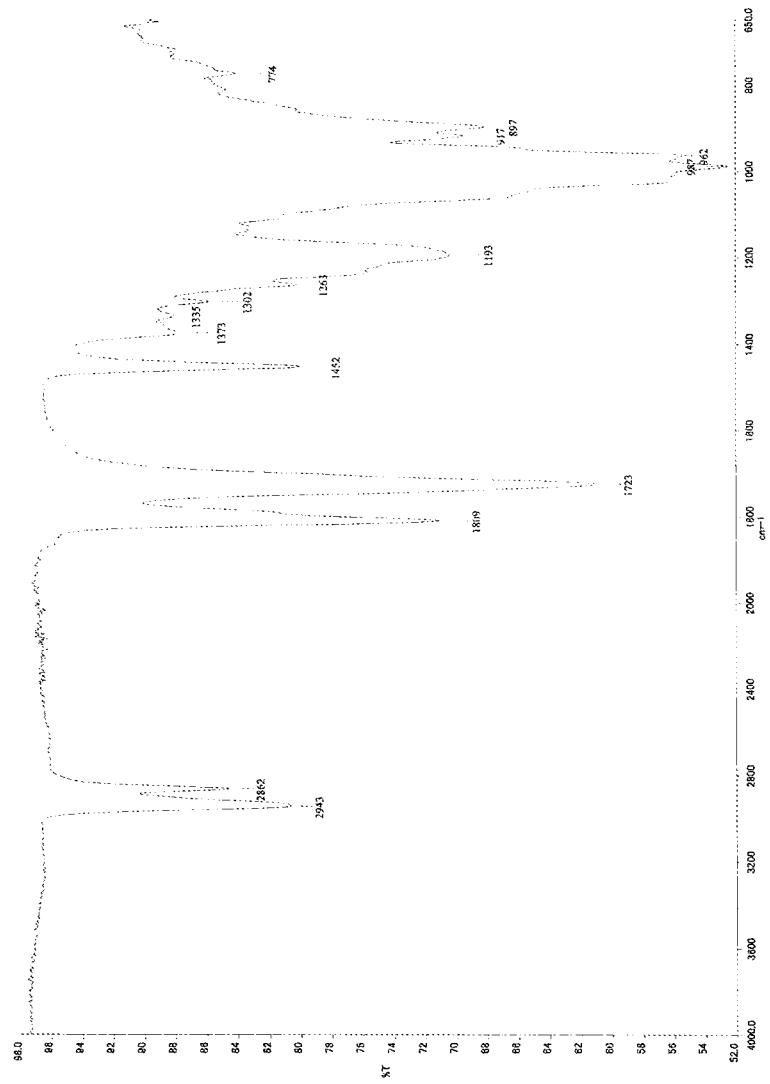
FIG. 8 is an infrared absorption spectrum of a polycarboxylic acid anhydride obtained by drying the polycarboxylic acid anhydride solution obtained in Example 8, and distilling off the solvent.

IR: 2943 cm$^{-1}$, 2862 cm$^{-1}$, 1809 cm$^{-1}$, 1723 cm$^{-1}$, 1452 cm$^{-1}$, 1302 cm$^{-1}$, 1193 cm$^{-1}$, and 987 cm$^{-1}$ FIG. 8 shows a peak of an acid anhydride group (1809 cm$^{-1}$), indicating that a target polycarboxylic acid anhydride was obtained.

Comparative Example 1

11.1 g of 1,6-HD (93.9 mmol) and 29.0 g of RIKACID HH (187.8 mmol, which is 2.0-fold mmol with respect to 1,6-HD) were added to 15.0 g of PGMEA, and the resulting product was stirred at 110° C. for 3 hours under nitrogen stream to obtain a PGMEA solution of dicarboxylic acid compound (1,6-HD/HH). 33.6 g of acetic anhydride (328.7 mmol, which is 3.5-fold mmol with respect to 1,6-HD) was added to the dicarboxylic acid compound solution above, and stirred at 100° C. for 1 hour under nitrogen stream. The pressure inside the reactor was gradually reduced to 10.7 to 13.3 kPa. Then, CHN was added dropwise to the reactor at a rate of 60 mL/h, and the condensation reaction was allowed to proceed at 100° C. over 5 hours, while acetic acid produced as a by-product was distilled off, together with CHN, from the reaction system at a rate of 60 mL/h. In this manner, a solution of polycarboxylic acid anhydride was obtained. Thereafter, the solution was diluted with PGMEA so that the polycarboxylic acid anhydride was 40 wt %. Using the obtained polycarboxylic acid anhydride solution, the number average molecular weight, the volatility at the time of heating, and the acid anhydride equivalent were measured. Table 2 shows the results.

Comparative Example 2

A solution of polycarboxylic acid anhydride was obtained as in Comparative Example 1, except that 15.0 g of BEPD (93.9 mmol) was used in place of 11.1 g of 1,6-HD (93.9 mmol). Thereafter, the solution was diluted with PGMEA so that the polycarboxylic acid anhydride was 40 wt %. Using the obtained polycarboxylic acid anhydride solution, the number average molecular weight, the volatility at the time of heating, and the acid anhydride equivalent were measured. Table 2 shows the results.

Comparative Example 3

A solution of polycarboxylic acid anhydride was obtained as in Comparative Example 1, except that 9.8 g of NPG (93.9 mmol) was used in place of 11.1 g of 1,6-HD (93.9 mmol). Thereafter, the solution was diluted with PGMEA so that the polycarboxylic acid anhydride was 40 wt %. Using the obtained polycarboxylic acid anhydride solution, the number average molecular weight, the volatility at the time of heating, and the acid anhydride equivalent were measured. Table 2 shows the results.

Comparative Example 4

A solution of polycarboxylic acid anhydride was obtained as in Comparative Example 1, except that 13.5 g of CHDM (93.9 mmol) was used in place of 11.1 g of 1,6-HD (93.9 mmol). Thereafter, the solution was diluted with PGMEA so that the polycarboxylic acid anhydride was 40 wt %. Using the obtained polycarboxylic acid anhydride solution, the number average molecular weight, the volatility at the time of heating, and the acid anhydride equivalent were measured. Table 2 shows the results.

Comparative Example 5

A solution of polycarboxylic acid anhydride was obtained as in Comparative Example 4, except that 31.6 g of RIKACID MH-T (187.8 mmol) was used in place of 29.0 g of RIKACID HH (187.8 mmol). Thereafter, the solution was diluted with PGMEA so that the polycarboxylic acid anhydride was 40 wt %. Using the obtained polycarboxylic acid anhydride solution, the number average molecular weight, the volatility at the time of heating, and the acid anhydride equivalent were measured. Table 2 shows the results.

Comparative Example 6

7.9 g of 1,6-HD (66.8 mmol), 20.6 g of RIKACID HH (133.6 mmol, which is 2.0-fold mmol with respect to 1,6-HD), and 11.5 g of CHDA (66.8 mmol, which is 1.0-fold mmol with respect to 1,6-HD) were added to 15.0 g of PGMEA, and the resulting product was stirred at 110° C. for 3 hours under nitrogen stream to obtain a PGMEA solution of dicarboxylic acid compound (1,6-HD/HH). 47.7 g of acetic anhydride (467.6 mmol, which is 7.0-fold mmol with respect to 1,6-HD) was added to the dicarboxylic acid compound solution and stirred at 100° C. for 1 hour under nitrogen stream. The pressure inside the reactor was gradually reduced to 10.7 to 13.3 kPa. Then, CHN was added dropwise to the reactor at a rate of 60 mL/h, and the condensation reaction was allowed to proceed at 100° C. over 5 hours, while acetic acid produced as a by-product was distilled off, together with CHN, from the reaction system at a rate of 60 mL/h. In this manner, a polycarboxylic acid anhydride solution was obtained. Thereafter, the solution was diluted with PGMEA so that the polycarboxylic acid anhydride was 40 wt %. Using the obtained polycarboxylic acid anhydride solution, the number average molecular weight, the volatility at the time of heating, and the acid anhydride equivalent were measured. Table 2 shows the results.

Comparative Example 7

A solution of polycarboxylic acid anhydride was obtained as in Comparative Example 4, except that 10.7 g of BEPD (66.8 mmol) was used in place of 7.9 g of 1,6-HD (66.8 mmol). Thereafter, the solution was diluted with PGMEA so that the polycarboxylic acid anhydride was 40 wt %. Using the obtained polycarboxylic acid anhydride solution, the number average molecular weight, the volatility at the time of heating, and the acid anhydride equivalent were measured. Table 2 shows the results.

Comparative Example 8

A solution of polycarboxylic acid anhydride was obtained as in Comparative Example 4, except that 7.0 g of NPG (66.8 mmol) was used in place of 7.9 g of 1,6-HD (66.8 mmol). Thereafter, the solution was diluted with PGMEA so that the polycarboxylic acid anhydride was 40 wt %. Using the obtained polycarboxylic acid anhydride solution, the number average molecular weight, the volatility at the time of heating, and the acid anhydride equivalent were measured.
Table 2 shows the results.

Comparative Examples 9 to 11

The volatility at the time of heating was measured with respect to RIKACID HH (Comparative Example 9), RIKACID MH-T (Comparative Example 10), and RIKACID HNA-100 (Comparative Example 11). Table 2 shows the results.
Number Average Molecular Weight
About 0.1 g of the polycarboxylic acid anhydride solution was dissolved in 2 mL of tetrahydrofuran, and a sample solution for molecular weight measurement was prepared. The number average molecular weight Mn was measured on a polystyrene basis using gel permeation chromatography (GPC) under the following measurement conditions.
Measurement Conditions:
Apparatus: pump (LC-20AD, produced by Shimadzu Corporation), column (Shodex KF-801, Shodex KF-802, Shodex KF-804, all of which are produced by Showa Denko K.K.), and detector (RID-10A, produced by Shimadzu Corporation)
Eluent: tetrahydrofuran
Column temperature: 40° C.; flow rate: 1.0 mL/min
Volatility at the Time of Heating
The solvent of the polycarboxylic acid anhydride solution was completely distilled off at 120° C. at a reduced pressure of 0.7 kPa over 30 to 40 minutes. After distilling off the solvent, 0.10 g of the obtained polycarboxylic acid anhydride was placed on a metal plate having a diameter of 40 mm and heated at 180° C. for 1 hour, and the volatility was measured based on the weight change before and after the heating. The volatility was calculated using the following equation (1).

$$\text{Volatility (\%)} = (W_2 - W_1) \times 100 / W_1 \quad (1)$$

$W_1$: Weight (g) of the polycarboxylic acid anhydride before heating
$W_2$: Weight (g) of the polycarboxylic acid anhydride after heating
Acid Anhydride Equivalent
3.00 g of the polycarboxylic acid anhydride solution was placed in an Erlenmeyer flask, and 10 mL of pyridine was added for dissolution. Further, 50 mL of ion exchange water was added and heat-refluxed for 3 hours, and the resulting product was allowed to cool to room temperature (25° C.). After being allowed to cool, 5 drops of 1 wt % phenolphthalein solution was added, and the mixture was titrated with a 0.5 M potassium hydroxide ethanol solution. The point at which coloration was maintained for 30 seconds was considered to be a terminal point. The acid anhydride equivalent was calculated using the following equation (2). The acid anhydride equivalent (g/eq) expresses a mass of the polycarboxylic acid anhydride solution containing 1 mol of acid anhydride group, in gram.

$$\text{Acid anhydride equivalent} = (B \times 2 \times 10^3) / (A \times N) \quad (2)$$

A: 0.5 M potassium hydroxide ethanol solution (mL) used in the titration
B: Sampled amount (g)
N: Normality of the potassium hydroxide ethanol solution Examples 10 to 19

Each of the polycarboxylic acid anhydride solutions obtained in Examples 1 to 9, an epoxy resin, and a cure accelerator were mixed at a composition ratio (parts by weight) shown in Table 3 to obtain an epoxy resin composition solution. The obtained epoxy resin composition solution was used to measure the gel time, glass transition temperature, initial transparency, thermal yellowing resistance, surface hardness, alkali resistance, NMP resistance, flexibility, and adhesiveness. Table 3 shows the results.

Comparative Examples 12 to 20

Each of the polycarboxylic acid anhydride solutions obtained in Comparative Examples 1 to 8 or MH-T, an epoxy resin, and a cure accelerator were mixed at a composition ratio (parts by weight) shown in Table 4 to obtain an epoxy resin composition solution. The obtained epoxy resin composition solution was used to measure the gel time, glass transition temperature, initial transparency, thermal yellowing resistance, surface hardness, alkali resistance, NMP resistance, flexibility, and adhesiveness. Table 4 shows the results.

Gel Time

In accordance with JIS C2161-B (ver. Mar. 23, 2010), several drops of the epoxy resin composition solution were dropped on a metal plate adjusted to 140° C., the composition surface was traced with wire, and the time (second) for forming a thread between the composition and the wire was measured.

Glass Transition Temperature

The epoxy resin composition solution was poured in a 4-cm diameter metal plate covered with aluminum foil to a thickness after curing of 100 μm, and the solvent was dried at 100° C. for 10 minutes, followed by curing at 130° C. for 2 hours. The aluminum foil was removed from the cured product, and the measurement was performed using a differential scanning calorimetry (DSC6220 (produced by SII NanoTechnology Inc.)) under the following measurement conditions, and the obtained inflection point was considered as the glass transition temperature (° C.).

Measurement Conditions:

The measurement was performed while the temperature was increased from −20° C. to 180° C. at a rate of 20° C./min.

Initial Transparency (YI) and Thermal Yellowing Resistance (ΔYI)

A cured product having a thickness of 100 μm was obtained in the same manner as the test sample for measuring the glass transition temperature was obtained, and the reflectance of the cured product in a state in which the aluminum foil was adhered on one surface was measured using a spectrocolorimeter CM-5 (produced by Konica Minolta Co., Ltd.). The YI was calculated based on the reflectance in accordance with ASTM D1925-70 (Reapproved 1988). The YI before the cured product was heat-treated, and the YI after the cured product was heat-treated at 150° C. for 5 days were measured, and the difference between these values was considered to be the thermal yellowing resistance (ΔYI). The YI represents the degree of yellowing in the cured layer. A smaller YI value indicates more excellent colorlessness and transparency, while a larger YI value indicates stronger yellowing. The ΔYI represents the degree of yellowing after thermal hysteresis, i.e., thermal yellowing resistance. A smaller ΔYI value indicates a more excellent thermal yellowing resistance of the cured product.

Surface Hardness

The epoxy resin composition solution was applied to a steel plate having a thickness of 300 μm, and the solvent was dried at 100° C. for 10 minutes, followed by curing at 130° C. for 2 hours to form a cured film having a thickness of 30 μm. The cured film was subjected to pencil scratch to measure the surface hardness, following JIS K 5600-5-4 (ver. Apr. 20, 1999). Specifically, the steel plate having the cured film to be measured was scratched about 10 mm with a pencil with a load of 1 kg from above at an angle of 45 degrees, and the degree of the scratch was evaluated. The hardness of the hardest pencil that did not make a scratch was considered to be the surface hardness.

Alkali Resistance

A cured film was obtained in the same manner as the test sample for measuring the surface hardness was obtained, and a 5 wt % NaOH aqueous solution was dropped on the cured film on the steel plate at an environmental temperature of 25° C. After a lapse of 30 minutes, the resulting product was washed with water, and changes in the appearance at a portion in which the solution was dropped was visually observed and evaluated. The evaluation criteria are shown below:

◯: No change was observed on the surface of the cured film.

x: Changes were observed on the surface of the cured film.

NMP Resistance

A cured film was obtained in the same manner as the test sample for measuring the surface hardness was obtained, and the NMP resistance was evaluated at an environmental temperature of 25° C. using N-methyl-2-pyrrolidone (NMP) by the same method as that described in the "Alkali Resistance" section. The evaluation criteria are shown below:

◯: No change was observed on the surface of the cured film.

x: Changes were observed on the surface of the cured film.

Flexibility

A cured film was obtained in the same manner as the test sample for measuring the surface hardness was obtained, the steel plate was bent to an angle of 180°, and the appearance of the cured film at the bent portion was visually observed and evaluated. The evaluation criteria are shown below:

◯: No appearance change was observed.

x: Lifting or peeling was observed in the film appearance.

Adhesiveness

A cured film was obtained in the same manner as the test sample for measuring the surface hardness was obtained, the cured film on the steel plate was subjected to a cross-cut test in accordance with JIS K 5600-5-6 (ver. Apr. 20, 1999), a cellophane adhesive tape was peeled off, and the appearance of the cured film was visually observed and evaluated. The evaluation criteria are shown below:

◯: No peeling is observed in the cured film.

x: Peeling is observed in the cured film.

TABLE 1

| Feed ratio (mol %) | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- |
| CHDA | — | — | 50 | 50 | 50 | 50 | 50 | 50 | 50 |
| HB/HH | 100 | — | 50 | — | — | — | — | — | — |
| 27-DH/HH | — | 100 | — | 50 | — | — | — | — | — |
| HB/MH-T | — | — | — | — | 50 | — | — | — | — |
| 1,4-CHD/HH | — | — | — | — | — | 50 | — | — | — |
| 1,4-CHD/MH-T | — | — | — | — | — | — | 50 | — | — |

TABLE 1-continued

| Feed ratio (mol %) | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| BHD/HH | — | — | — | — | — | — | — | 50 | — |
| BHD/MH-T | — | — | — | — | — | — | — | — | 50 |
| Number average molecular weight | 4700 | 3400 | 3200 | 2200 | 2600 | 3200 | 4300 | 3200 | 3200 |
| Volatility (%) at the time of heating | 0 | 0 | 0 | 0 | 0 | 0 | 0 | 0 | 0 |
| Acid anhydride equivalent | 1140 | 925 | 935 | 613 | 757 | 610 | 635 | 728 | 734 |

TABLE 2

| Feed ratio (mol %) | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|---|---|
| CHDA | — | — | — | — | — | 50 | 50 | 50 | — | — | — |
| 1,6-HD/HH | 100 | — | — | — | — | 50 | — | — | — | — | — |
| BEPD/HH | — | 100 | — | — | — | — | 50 | — | — | — | — |
| NPG/HH | — | — | 100 | — | — | — | — | 50 | — | — | — |
| CHDM/HH | — | — | — | 100 | — | — | — | — | — | — | — |
| CHDM/MH-T | — | — | — | — | 100 | — | — | — | — | — | — |
| Number average molecular weight | 3900 | 3100 | 4200 | 4000 | 3300 | 1300 | 1800 | 1300 | — | — | — |
| Volatility (%) at the time of heating | 0 | 0 | 0 | 0 | 0 | 0 | 0 | 0 | 100 | 99.3 | 99.2 |
| Acid anhydride equivalent | 611 | 642 | 709 | 734 | 756 | 515 | 734 | 535 | — | — | — |

TABLE 3

| | | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|
| Composition formula (parts by weight) | jER828 | 100 | 100 | 100 | 100 | 100 | 100 | 100 | 100 | 100 | — |
| | HEB-100 | — | — | — | — | — | — | — | — | — | 100 |
| | Example 1 | 616 | — | — | — | — | — | — | — | — | 616 |
| | Example 2 | — | 500 | — | — | — | — | — | — | — | — |
| | Example 3 | — | — | 506 | — | — | — | — | — | — | — |
| | Example 4 | — | — | — | 331 | — | — | — | — | — | — |
| | Example 5 | — | — | — | — | 409 | — | — | — | — | — |
| | Example 6 | — | — | — | — | — | 330 | — | — | — | — |
| | Example 7 | — | — | — | — | — | — | 343 | — | — | — |
| | Example 8 | — | — | — | — | — | — | — | 394 | — | — |
| | Example 9 | — | — | — | — | — | — | — | — | 397 | — |
| | TBP-BB | 1 | 1 | 1 | 1 | 1 | 1 | 1 | 1 | 1 | 1 |
| Epoxy curing properties | Gel time (second) | 220 | 280 | 310 | 270 | 300 | 280 | 270 | 270 | 310 | 280 |
| | Glass transition temperature (° C.) | 120 | 128 | 127 | 137 | 129 | 122 | 120 | 129 | 127 | 115 |
| | Initial transparency (YI) | 0.0 | 1.7 | −0.1 | 0.6 | −0.1 | −0.1 | 0.0 | −0.1 | −0.1 | 0.0 |
| | Thermal yellowing resistance (ΔYI) | 1.6 | 1.9 | 1.5 | 1.2 | 1.2 | 2.2 | 3.2 | 1.4 | 1.5 | 1.7 |
| | Surface hardness | H | H | H | H | H | H | H | H | H | H |
| | Alkali resistance | ○ | ○ | ○ | ○ | ○ | ○ | ○ | ○ | ○ | ○ |
| | NMP resistance | ○ | ○ | ○ | ○ | ○ | ○ | ○ | ○ | ○ | ○ |
| | Flexibility | ○ | ○ | ○ | ○ | ○ | ○ | ○ | ○ | ○ | ○ |
| | Adhesiveness | ○ | ○ | ○ | ○ | ○ | ○ | ○ | ○ | ○ | ○ |

TABLE 4

| | | Comp. Ex. 12 | Comp. Ex. 13 | Comp. Ex. 14 | Comp. Ex. 15 | Comp. Ex. 16 | Comp. Ex. 17 | Comp. Ex. 18 | Comp. Ex. 19 | Comp. Ex. 20 |
|---|---|---|---|---|---|---|---|---|---|---|
| Composition formula (parts by weight) | jER828 | 100 | 100 | 100 | 100 | 100 | 100 | 100 | 100 | 100 |
| | Comparative Example 1 | 330 | — | — | — | — | — | — | — | — |
| | Comparative Example 2 | — | 347 | — | — | — | — | — | — | — |
| | Comparative Example 3 | — | — | 383 | — | — | — | — | — | — |
| | Comparative Example 4 | — | — | — | 388 | — | — | — | — | — |
| | Comparative Example 5 | — | — | — | — | 400 | — | — | — | — |
| | Comparative Example 6 | — | — | — | — | — | 278 | — | — | — |
| | Comparative Example 7 | — | — | — | — | — | — | 397 | — | — |
| | Comparative Example 8 | — | — | — | — | — | — | — | 289 | — |

TABLE 4-continued

|  |  | Comp. Ex. 12 | Comp. Ex. 13 | Comp. Ex. 14 | Comp. Ex. 15 | Comp. Ex. 16 | Comp. Ex. 17 | Comp. Ex. 18 | Comp. Ex. 19 | Comp. Ex. 20 |
|---|---|---|---|---|---|---|---|---|---|---|
|  | MH-T | — | — | — | — | — | — | — | — | 91 |
|  | TBP-BB | 1 | 1 | 1 | 1 | 1 | 1 | 1 | 1 | 1 |
| Epoxy curing properties | Gel time (second) | 340 | 310 | 330 | 260 | 270 | 260 | 320 | 260 | 250 |
|  | Glass transition temperature (° C.) | 55 | 87 | 68 | 93 | 92 | 63 | 89 | 93 | 26 |
|  | Initial transparency (YI) | 2.3 | 0.1 | 0.0 | 0.0 | 0.9 | 0.2 | 0.0 | 0.0 | 3.2 |
|  | Thermal yellowing resistance (ΔYI) | 4.0 | 3.8 | 6.2 | 5.3 | 4.2 | 5.5 | 4.2 | 4.4 | 5.2 |
|  | Surface hardness | HB | HB | HB | H | HB | HB | H | H | 5B |
|  | Alkali resistance | x | ○ | x | ○ | ○ | x | ○ | x | ○ |
|  | NMP resistance | x | x | ○ | x | x | x | ○ | ○ | x |
|  | Flexibility | ○ | x | x | ○ | x | ○ | ○ | ○ | x |
|  | Adhesiveness | ○ | ○ | ○ | ○ | ○ | ○ | ○ | ○ | x |

The results shown in Tables 1 to 4 confirm the following.

The polycarboxylic acid anhydrides obtained in Examples 1 to 9 and Comparative Examples 1 to 8 hardly underwent volatilization at the time of heating. It is thus clear that these polycarboxylic acid anhydrides are excellent in terms of nonvolatile properties, compared with known acid anhydrides, such as HH, which were used in Comparative Examples 9 to 11 (the volatility was 90% or more at the time of heating).

The epoxy resin composition solutions obtained in Examples 10 to 19, when cured, did not suffer from deterioration in its properties and achieved stable properties, which made it possible to obtain a resin molded article having excellent heat resistance (Tg), transparency, thermal yellowing resistance, surface hardness, solvent resistance, flexibility and adhesiveness all together.

The epoxy resin composition solutions obtained in Comparative Examples 12 to 20, when cured, suffered from a low glass transition temperature and unsatisfactory thermal yellowing resistance. When a known acid anhydride (MH-T) used in Comparative Example 20 was used as a curable composition, the acid anhydride underwent volatilization as the resin was cured by heating; a partial loss of only the acid anhydride in the curable composition caused an imbalance of the composition of the resin, resulting in a failure to obtain a desired cured product. Therefore, the epoxy resin composition solutions obtained in Comparative Examples 12 to 20 are considered to be unsuitable for use in transparent coating materials for display.

In contrast, the polycarboxylic acid anhydride of the present invention achieves the excellent effects described above, and is suitable for use in transparent coating materials for display.

INDUSTRIAL APPLICABILITY

The present invention relates to a polycarboxylic acid anhydride having a structural unit represented by the following Formula (1).

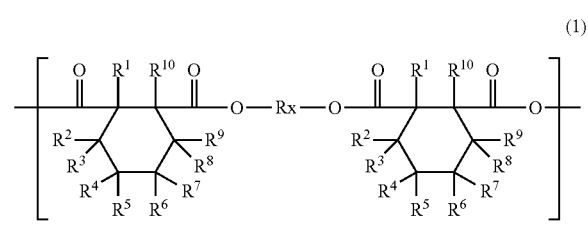

(1)

The polycarboxylic acid anhydride of the present invention is not volatile. Thus, when the polycarboxylic acid anhydride is used, for example, as an epoxy resin-curing agent, the balance of the composition of the resin composition is stabilized, making it possible to provide a resin molded article having excellent heat resistance, transparency, thermal yellowing resistance, surface hardness, solvent resistance, flexibility, and adhesiveness. Accordingly, the polycarboxylic acid anhydride of the present invention, which has excellent properties as above, may be used in a wide variety of industrial fields. In particular, the polycarboxylic acid anhydride of the present invention is suitably used for a coating material for display.

The invention claimed is:

1. A polycarboxylic acid anhydride having a structural unit represented by Formula (3):

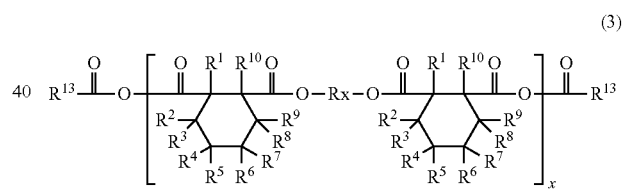

(3)

wherein Rx represents a cycloalkylene group or a group in which two or more cycloalkylene groups are bonded by a single bond or a divalent group, the cycloalkylene group being optionally substituted;

$R^1$ to $R^{10}$ are identical or different and each represent hydrogen or optionally substituted alkyl;

two groups among $R^1$ to $R^{10}$ may together form a divalent group;

$R^{13}$ represents optionally substituted alkyl or optionally substituted cycloalkyl; and x represents 2 or more.

2. The polycarboxylic acid anhydride according to claim 1, wherein Rx is a divalent group represented by Formula (2):

(2)

wherein $W_1$ and $W_2$ are identical or different and each represent optionally substituted cycloalkylene;

$L_1$ is a single bond, optionally substituted alkylene, optionally substituted cycloalkylene, optionally substituted cycloalkylidene, —O—, —S—, —CO—, —SO—, or —$SO_2$—;

n is an integer of 0 or 1; and the wavy lines represent attachment sites.

3. The polycarboxylic acid anhydride according to claim 2, wherein $W_1$ and $W_2$ are identical or different, and are selected from divalent groups represented by Formula (a) or (b):

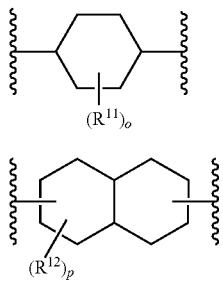

wherein $R^{11}$ and $R^{12}$ are identical or different and each represent optionally substituted alkyl or optionally substituted cycloalkyl;

o is an integer of 0 to 8, when o represents 2 to 8, two to eight $R^{11}$ groups may be identical or different, and when o represents 2 to 8, two $R^{11}$ groups may together form a divalent group;

p is an integer of 0 to 12, when p represents 2 to 12, two to twelve $R^{12}$ groups may be identical or different, and when p represents 2 to 12, two $R^{12}$ groups may together form a divalent group; and the wavy lines represent attachment sites.

4. A method for producing the polycarboxylic acid anhydride of claim 1, the method comprising the step of performing a condensation reaction in a reaction liquid containing a compound represented by Formula (4):

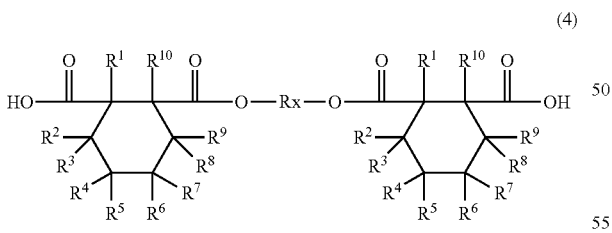

wherein Rx and $R^1$ to $R^{11}$ are as defined above, in the presence of a condensation agent represented by Formula (10'):

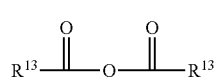

wherein $R^{13}$ is as defined above.

5. The polycarboxylic acid anhydride obtained by the production method of claim 4.

6. A polycarboxylic acid anhydride having a structural unit represented by Formula (1):

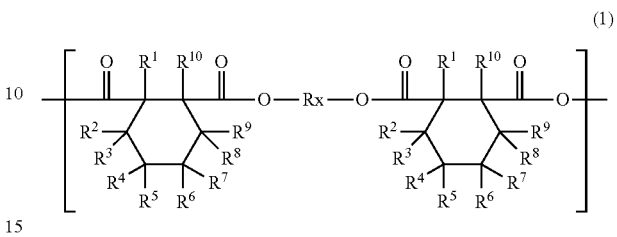

wherein Rx represents a cycloalkylene group or a group in which two or more cycloalkylene groups are bonded by a single bond or a divalent group, the cycloalkylene group being optionally substituted;

$R^1$ to $R^{10}$ are identical or different and each represent hydrogen or optionally substituted alkyl; and two groups among $R^1$ to $R^{11}$ may together form a divalent group; and a structural unit represented by Formula (5):

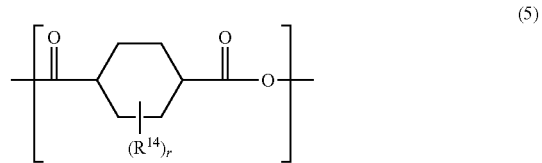

wherein each $R^{14}$ is identical or different and represents optionally substituted alkyl or optionally substituted cycloalkyl;

r is an integer of 0 to 8, when r represents 2 to 8, two to eight $R^{14}$ groups may be identical or different, and when r represents 2 to 8, two $R^{14}$ groups may together form a divalent group.

7. The polycarboxylic acid anhydride according to claim 6, wherein Rx is a divalent group represented by Formula (2):

wherein $W_1$ and $W_2$ are identical or different and each represent optionally substituted cycloalkylene;

$L_1$ is a single bond, optionally substituted alkylene, optionally substituted cycloalkylene, optionally substituted cycloalkylidene, —O—, —S—, —CO—, —SO—, or —$SO_2$—;

n is an integer of 0 or 1; and the wavy lines represent attachment sites.

8. The polycarboxylic acid anhydride according to claim 7, wherein $W_1$ and $W_2$ are identical or different, and are selected from divalent groups represented by Formula (a) or (b):

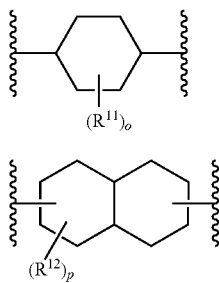

(a)

(b)

wherein $R^{11}$ and $R^{12}$ are identical or different and each represent optionally substituted alkyl or optionally substituted cycloalkyl;

o is an integer of 0 to 8, when o represents 2 to 8, two to eight $R^{11}$ groups may be identical or different, and when o represents 2 to 8, two $R^{11}$ groups may together form a divalent group;

p is an integer of 0 to 12, when p represents 2 to 12, two to twelve $R^{12}$ groups may be identical or different, and when p represents 2 to 12, two $R^{12}$ groups may together form a divalent group; and the wavy lines represent attachment sites.

9. The polycarboxylic acid anhydride according to claim 6, wherein the polycarboxylic acid anhydride having the structural unit represented by Formula (1) and the structural unit represented by Formula (5) is a compound represented by Formula (6):

performing a condensation reaction in a reaction liquid containing a compound represented by Formula (4):

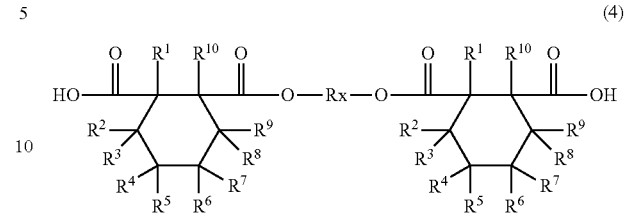

wherein Rx, and $R^1$ to $R^{10}$ are as defined above,
and a cyclohexanedicarboxylic acid compound represented by Formula (7):

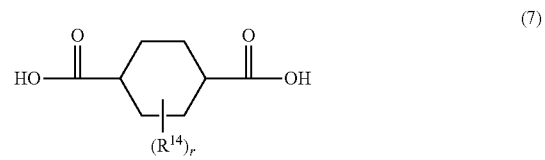

wherein $R^{14}$ and r are as defined above.

11. A polycarboxylic acid anhydride obtained by the production method of claim 10.

12. An epoxy resin-curing agent containing the polycarboxylic acid anhydride of claim 1.

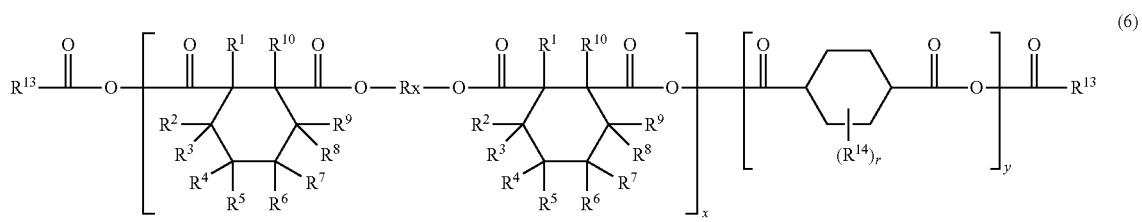

wherein Rx, $R^1$ to $R^{10}$, $R^{14}$, and r are as defined above,
$R^{13}$ represents optionally substituted alkyl or optionally substituted cycloalkyl,
x represents 1 or more, y represents 1 or more, x+y is 2 or more, and
the sequence of units x and y is not limited to the above order.

10. A method for producing the polycarboxylic acid anhydride of claim 6, the method comprising the step of 13. A composition containing the epoxy resin-curing agent (a) of claim 12, an epoxy resin (b), and a cure accelerator (c).

14. A molded article obtained by curing the composition of claim 13.

15. An epoxy resin-curing agent containing the polycarboxylic acid anhydride of claim 6.

* * * * *